US012574093B1

(12) United States Patent
Kim

(10) Patent No.: US 12,574,093 B1
(45) Date of Patent: Mar. 10, 2026

(54) METHOD AND APPARATUS FOR BEAM MANAGEMENT IN MOBILE WIRELESS COMMUNICATION SYSTEM

(71) Applicant: SETLAB Co., LTD., Gyeonggi-do (KR)

(72) Inventor: Soenghun Kim, Gyeonggi-do (KR)

(73) Assignee: SETLAB Co., LTD., Gyeonggi-do (KR)

( * ) Notice: Subject to any disclaimer, the term of this patent is extended or adjusted under 35 U.S.C. 154(b) by 0 days.

(21) Appl. No.: 19/333,586

(22) Filed: Sep. 19, 2025

(30) Foreign Application Priority Data

Nov. 27, 2024  (KR) ......................... 10-2024-0172244
Sep. 17, 2025  (KR) ......................... 10-2025-0133284

(51) Int. Cl.
　　*H04B 7/06* 　　　　(2006.01)
　　*H04W 24/10* 　　　(2009.01)
(52) U.S. Cl.
　　CPC ....... *H04B 7/0626* (2013.01); *H04B 7/06952* (2023.05); *H04W 24/10* (2013.01)
(58) Field of Classification Search
　　None
　　See application file for complete search history.

(56) References Cited

U.S. PATENT DOCUMENTS

2014/0192736 A1 *  7/2014  Jeong ........................ H04L 5/00
　　　　　　　　　　　　　　　　　　　　　　370/329

OTHER PUBLICATIONS

3GPP, "3GPP TSG-RAN WG2 Meeting #128", Nov. 18-22, 2024, 155 pages.
3GPP, "3rd Generation Partnership Project; Technical Specification Group Radio Access Network; NR; Physical layer procedures for control (Release 18)", Sep. 2024, 312 pages, 3GPP TS 38.213 V18.4.0.
3GPP, "3rd Generation Partnership Project; Technical Specification Group Radio Access Network; NR; Physical layer procedures for data (Release 18)", Sep. 2024, 301 pages, 3GPP TS 38.214 V18.4.0.
3GPP, "3rd Generation Partnership Project; Technical Specification Group Radio Access Network; NR; Medium Access Control (MAC) protocol specification (Release 18)", Sep. 2024, 335 pages, 3GPP TS 38.321 V18.3.0.
3GPP, "3rd Generation Partnership Project; Technical Specification Group Radio Access Network; NR; Radio Resource Control (RRC) protocol specification (Release 18)", Sep. 2024, 1694 pages, 3GPP TS 38.331 V18.3.0.

(Continued)

*Primary Examiner* — Suhail Khan
(74) *Attorney, Agent, or Firm* — Nicholas Park

(57) ABSTRACT

Aspects of the present disclosure are to enhance AIML based beam management in mobile communication system. The method of the terminal includes receiving from a base station a radio resource control (RRC) reconfiguration message comprising one or more sets of configuration parameters for Channel Status Information (CSI) report and an applicability report configuration parameter; transmitting to the base station an uplink RRC message for applicability reporting; receiving from the base station a specific Medium Access Control (MAC) Control Element (CE); and based on that the specific MAC CE is received, performing prediction for a first specific resource based on a measurement associated with a second specific resource.

10 Claims, 13 Drawing Sheets

(56)  References Cited

OTHER PUBLICATIONS

Korean Office Action for KR Application No. 10-2025-0133284 dated Dec. 15, 2025, (Office Action in Korean with Machine Translated English translation), 10 pages.
Samsung (Moderator), R1-2410734, FL summary #1 for AI/ML in beam management, 3GPP TSG RAN WG1 #119, 3GPP (Nov. 20, 2024) 249 pages.
Nokia et al., R1-2400793, AI/ML for Beam Management, 3GPP TSG RAN WG1 #116, 3GPP (Feb. 19, 2024) 27 pages.

* cited by examiner

User Plane Protocol Stack

Control Plane Protocol Stack

3B10

| R | Serving Cell ID | BWP ID |
|---|---|---|
| E | Short Associated ID | |
| R | Serving Cell ID | BWP ID |
| E | Short Associated ID | |
| R | Serving Cell ID | BWP ID |
| E | Short Associated ID | |

3B20

| R | Serving Cell ID | | | | | BWP ID | |
|---|---|---|---|---|---|---|---|
| R | R | R | L/R | S3 | S2 | S1 | S0 |
| R | Short Associated ID | | | | | | |
| R | Short Associated ID | | | | | | |
| R | Short Associated ID | | | | | | |
| R | Short Associated ID | | | | | | |

FIG.3B

METHOD AND APPARATUS FOR BEAM MANAGEMENT IN MOBILE WIRELESS COMMUNICATION SYSTEM

CROSS-REFERENCE TO RELATED APPLICATION

This application claims priority to and the benefit of Korean Patent Application Nos. 10-2024-0172244, filed on Nov. 27, 2024, and 10-2025-0133284, filed on Sep. 17, 2025. Each of the above documents is hereby incorporated herein by reference in its entirety.

BACKGROUND

Technical Field

The present disclosure relates to AI/ML based beam management operation in wireless mobile communication system.

Related Art

The rapid evolution of 5G New Radio (NR) networks has led to the widespread adoption of millimeter wave (mm-Wave) technology, which offers significant bandwidth and exceptionally high data rates. However, mmWave signals inherently suffer from substantial propagation attenuation and sensitivity to environmental factors, necessitating precise directional beamforming to maintain robust communication links. Beam management (BM), the process of aligning the transmitter and receiver beams, is thus a critical operation to ensure communication quality and link reliability.

Traditional BM techniques face significant challenges, particularly in scenarios involving user equipment (UE) with moderate to high mobility. These challenges include high signaling overhead, increased latency, and limited accuracy in beam selection. The conventional exhaustive beam sweeping methods to identify optimal beams result in inefficient use of network resources and elevated power consumption, ultimately degrading the user experience.

In this context, incorporating Artificial Intelligence (AI) and Machine Learning (ML) techniques into BM is essential to overcome these limitations. AI/ML-enabled BM can significantly improve beam prediction accuracy without increasing signaling overhead, thereby reducing latency and improving overall system efficiency. By enabling more intelligent, adaptive, and real-time beam selection, AI/ML-based solutions address the critical bottlenecks of legacy BM methods, especially in dynamic and high-mobility environments.

Therefore, there exists a strong need for innovative NR AIML Beam management techniques that leverage AI/ML algorithms to enhance beam alignment precision, minimize overhead, and reduce latency. Such advancements are vital to meet the performance requirements of next-generation wireless networks and to facilitate seamless, high-quality communications in diverse and challenging scenarios.

SUMMARY

Aspects of the present disclosure are to enhance AIML based beam management in mobile communication system. The method of the terminal includes receiving from a base station a radio resource control (RRC) reconfiguration message comprising one or more sets of configuration parameters for Channel Status Information (CSI) report and an applicability report configuration parameter; transmitting to the base station an uplink RRC message for applicability reporting; receiving from the base station a specific Medium Access Control (MAC) Control Element (CE); and based on that the specific MAC CE is received, performing prediction for a first specific resource based on a measurement associated with a second specific resource.

BRIEF DESCRIPTION OF THE DRAWINGS

FIG. 3B illustrates formats of MAC CEs.

DETAILED DESCRIPTION

Figure 1A:
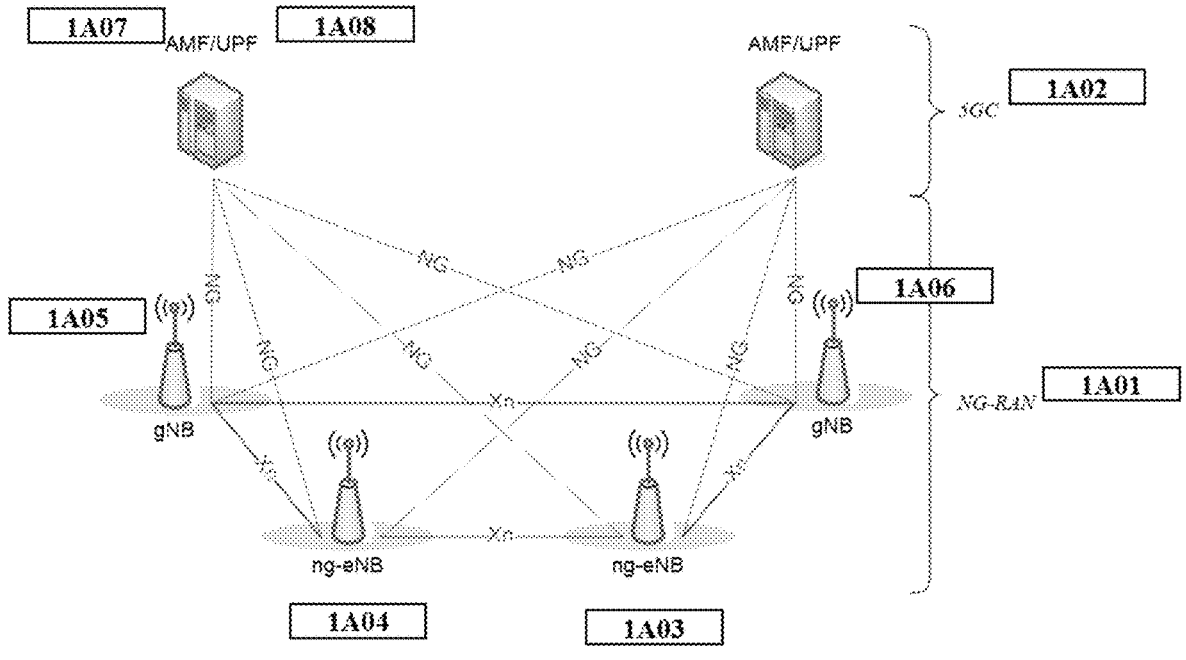
FIG. 1A is a diagram illustrating the architecture of an 5G system and a NG-RAN.

Hereinafter, embodiments of the present disclosure will be described in detail with reference to the accompanying drawings. In addition, in the description of the present disclosure, if it is determined that a detailed description of a related known function or configuration may unnecessarily obscure the gist of the present disclosure, the detailed description thereof will be omitted. In addition, the terms to be described later are terms defined in consideration of functions in the present disclosure, which may vary according to intentions or customs of users and operators. Therefore, the definition should be made based on the content throughout this specification.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the 3GPP standards are used for convenience of explanation. However, the present disclosure is not limited by use of these terms and definitions and other arbitrary terms and definitions may be employed instead.

In the present disclosure, followings are used interchangeably:

Terminal and UE and wireless device;

Information Element (IE) and set of parameters;

Parameter and field and IE;

Base station and GNB;

UAI and UEAssistanceInformation and UE assistance information message.

The integration of Artificial Intelligence (AI) and Machine Learning (ML) in New Radio (NR) systems necessitates efficient and effective data collection methods. These methods are crucial for training AI/ML models to optimize network performance, manage resources, and enhance user experiences. The following outlines various data collection techniques for NR systems:

>: Network Monitoring: Continuous monitoring of network parameters, such as signal strength, interference levels, and user mobility patterns, provides a rich dataset for AI/ML algorithms. This data is collected through network elements, including base stations and user equipment.

>: User Equipment Feedback: Data is gathered directly from user devices, including information on signal quality, data throughput, and application usage. This feedback helps in understanding user behavior and network performance from the end-user perspective.

>: Simulation and Emulation: Synthetic data is generated through network simulations and emulations, replicating various network conditions and user behaviors. This method allows for controlled data collection, enabling the training of AI/ML models under specific scenarios.

>: Environmental Sensing: Sensors deployed within the network environment collect data on physical conditions, such as temperature, humidity, and geographical features. This environmental data is used to understand its impact on network performance and optimize AI/ML models accordingly.

>: Historical Data Analysis: Historical network data is analyzed to identify patterns and trends. This retrospective analysis provides valuable insights for training AI/ML models, enabling predictive analytics and proactive network management.

The effective collection and utilization of data are fundamental to the successful implementation of AI/ML in NR systems. These methods ensure that AI/ML models are trained on comprehensive and representative datasets, leading to improved network performance and user satisfaction.

To enable efficient data collection, it is essential that UE starts and stops data transfer with sufficient controllability and self-estimation.

FIG. 1A is a diagram illustrating the architecture of an 5G system and a NG-RAN to which the disclosure may be applied.

5G system consists of NG-RAN 1A01 and 5GC 1A02. An NG-RAN node is either:

>1: a gNB, providing NR user plane and control plane protocol terminations towards the UE; or >1: an ng-eNB, providing E-UTRA user plane and control plane protocol terminations towards the UE.

The gNBs 1A05 or 1A06 and ng-eNBs 1A03 or 1A04 are interconnected with each other by means of the Xn interface. The gNBs and ng-eNBs are also connected by means of the NG interfaces to the 5GC, more specifically to the AMF (Access and Mobility Management Function) and to the UPF (User Plane Function). AMF 1A07 and UPF 1A08 may be realized as a physical node or as separate physical nodes.

A gNB 1A05 or 1A06 or an ng-eNBs 1A03 or 1A04 hosts the various functions listed below.

>1: Functions for Radio Resource Management such as Radio Bearer Control, Radio Admission Control, Connection Mobility Control, Dynamic allocation of resources to UEs in uplink, downlink and sidelink (scheduling); and >1: IP and Ethernet header compression, uplink data decompression and encryption of user data stream; and >1: Selection of an AMF at UE attachment when no routing to an MME can be determined from the information provided by the UE; and >1: Routing of User Plane data towards UPF; and >1: Scheduling and transmission of paging messages; and >1: Scheduling and transmission of broadcast information (originated from the AMF or O&M); and >1: Measurement and measurement reporting configuration for mobility and scheduling; and >1: Session Management; and >1: QoS Flow management and mapping to data radio bearers; and >1: Support of UEs in RRC_INACTIVE state; and The AMF 1A07 hosts the functions such as NAS signaling, NAS signaling security, AS security control, SMF selection, Authentication, Mobility management and positioning management.

The UPF 1A08 hosts the functions such as packet routing and forwarding, transport level packet marking in the uplink, QoS handling and the downlink, mobility anchoring for mobility etc.

Figure 1B:
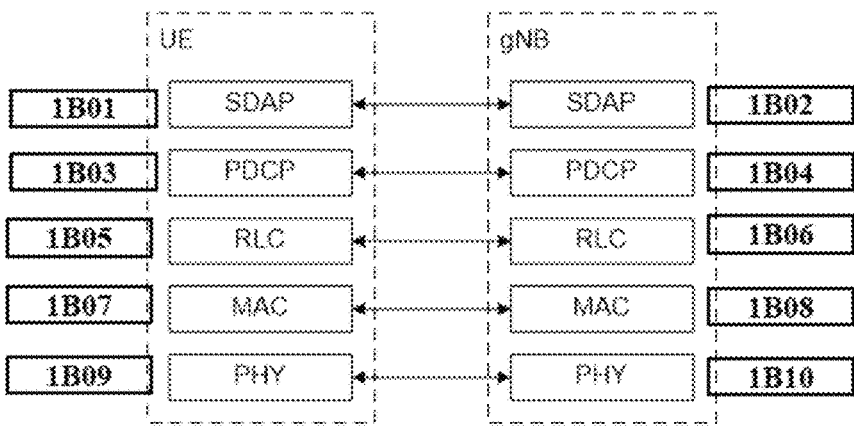
FIG. 1B is a diagram illustrating a wireless protocol architecture in an 5G system.
Figure 1B:
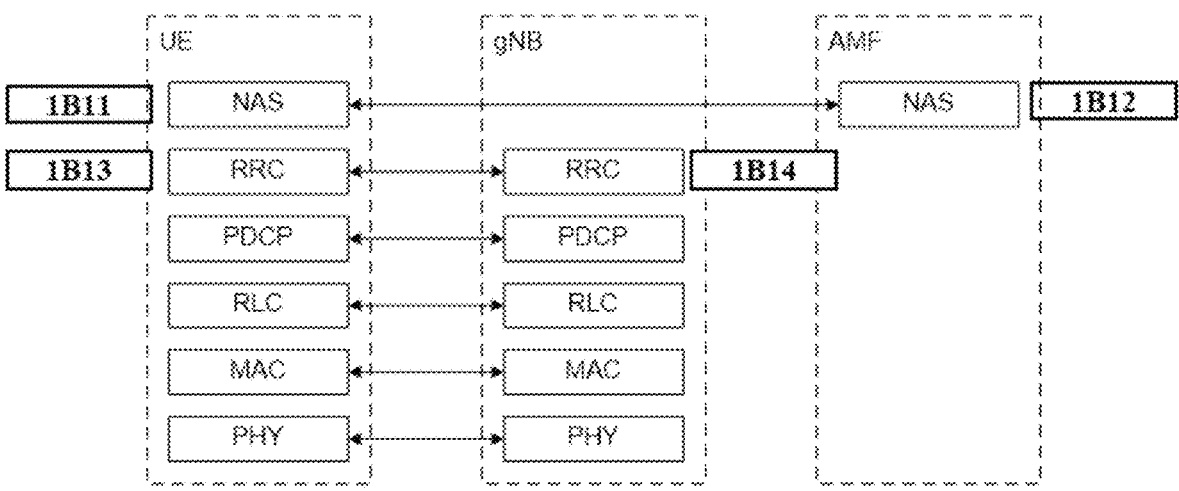

FIG. 1B is a diagram illustrating a wireless protocol architecture in an 5G system to which the disclosure may be applied.

User plane protocol stack consists of SDAP 1B01 or 1B02, PDCP 1B03 or 1B04, RLC 1B05 or 1B06, MAC 1B07 or 1B08 and PHY 1B09 or 1B10. Control plane protocol stack consists of NAS 1B11 or 1B12, RRC 1B13 or 1B14, PDCP, RLC, MAC and PHY.

Each protocol sublayer performs functions related to the operations listed below.

NAS: authentication, mobility management, security control etc.

RRC: System Information, Paging, Establishment, maintenance and release of an RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc.

SDAP: Mapping between a QoS flow and a data radio bearer, Marking QoS flow ID (QFI) in both DL and UL packets.

PDCP: Transfer of data, Header compression and decompression, Ciphering and deciphering, Integrity protection and integrity verification, Duplication, Reordering and in-order delivery, Out-of-order delivery etc.

RLC: Transfer of upper layer PDUs, Error Correction through ARQ, Segmentation and re-segmentation of RLC SDUs, Reassembly of SDU, RLC re-establishment etc.

MAC: Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc.

PHY: Channel coding, Physical-layer hybrid-ARQ processing, Rate matching, Scrambling, Modulation, Layer mapping, Downlink Control Information, Uplink Control Information etc.

Figure 1C:
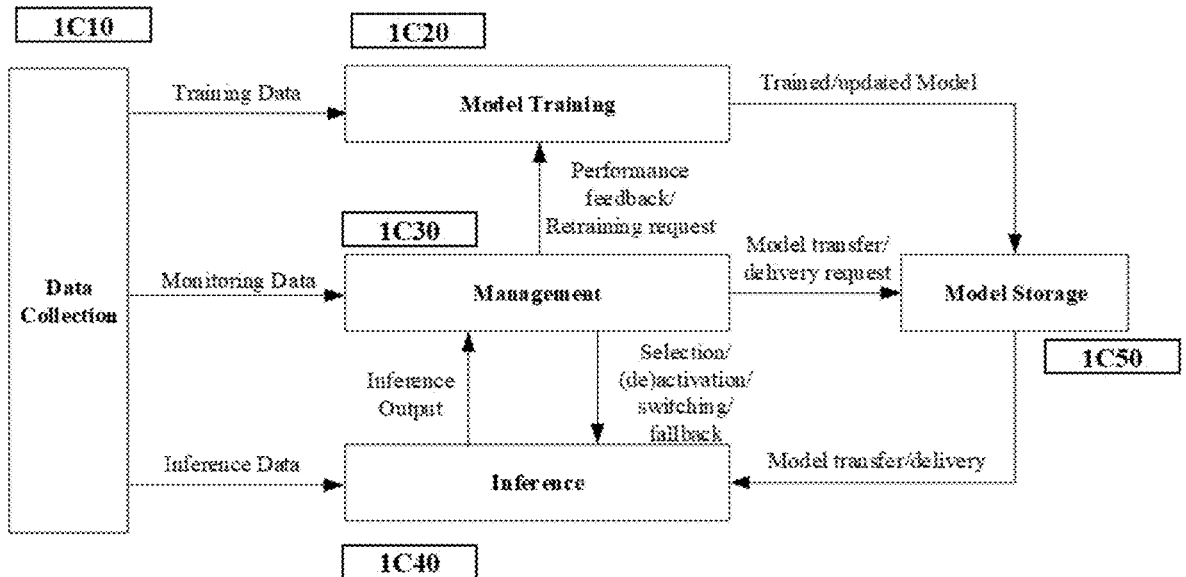
FIG. 1C is a diagram illustrating a Functional framework for AI/ML for NR air interface.

FIG. 1C illustrates functional framework of AI/ML for NR.

Data Collection 1C10 is a function that provides input data to the Model Training, Management, and Inference functions.

>: Training Data: Data needed as input for the AI/ML Model Training function.

>: Monitoring Data: Data needed as input for the Management of AI/ML Models or AI/ML functionalities.

>: Inference Data: Data needed as input for the AI/ML Inference function.

Model Training 1C20 is a function that performs AI/ML model training, validation, and testing which may generate model performance metrics which can be used as part of the model testing procedure. The Model Training function is also responsible for data preparation (e.g., data pre-processing and cleaning, formatting, and transformation) based on Training Data delivered by a Data Collection function, if required.

>: Trained/Updated Model: In case of having a Model Storage function, this is used to deliver trained, validated, and tested AI/ML models to the Model Storage function, or to deliver an updated version of a model to the Model Storage function.

Management 1C30 is a function that oversees the operation (e.g., selection/(de) activation/switching/fallback) and monitoring of AI/ML models or AI/ML functionalities. This function is also responsible for making decisions to ensure the proper inference operation based on data received from the Data Collection function and the Inference function.

>: Selection/(de) activation/switching/fallback: Information needed as input to manage the Inference function. Concerning information may include selection/(de) activation/switching of AI/ML models or AI/ML-based functionalities, fallback to non-AI/ML operation (i.e., not relying on inference process), etc. . . . .

>: Model Transfer/Delivery Request: Used to request model(s) to the Model Storage function.

>: Performance feedback/Retraining request: Information needed as input for the Model Training function, e.g., for model (re) training or updating purposes.

1C40 Inference is a function that provides outputs from the process of applying AI/ML models or AI/ML functionalities to new data (i.e., Inference Data). The Inference function is also responsible for data preparation (e.g., data pre-processing and cleaning, formatting, and transformation) based on Inference Data delivered by a Data Collection function, if required.

>: Inference Output: Data used by the Management function to monitor the performance of AI/ML models or AI/ML functionalities.

Model Storage 1C50 is a function responsible for storing trained/updated models that can be used to perform the inference process.

>: Model Transfer/Delivery: Used to deliver an AI/ML model to the Inference function.

Figure 2A:
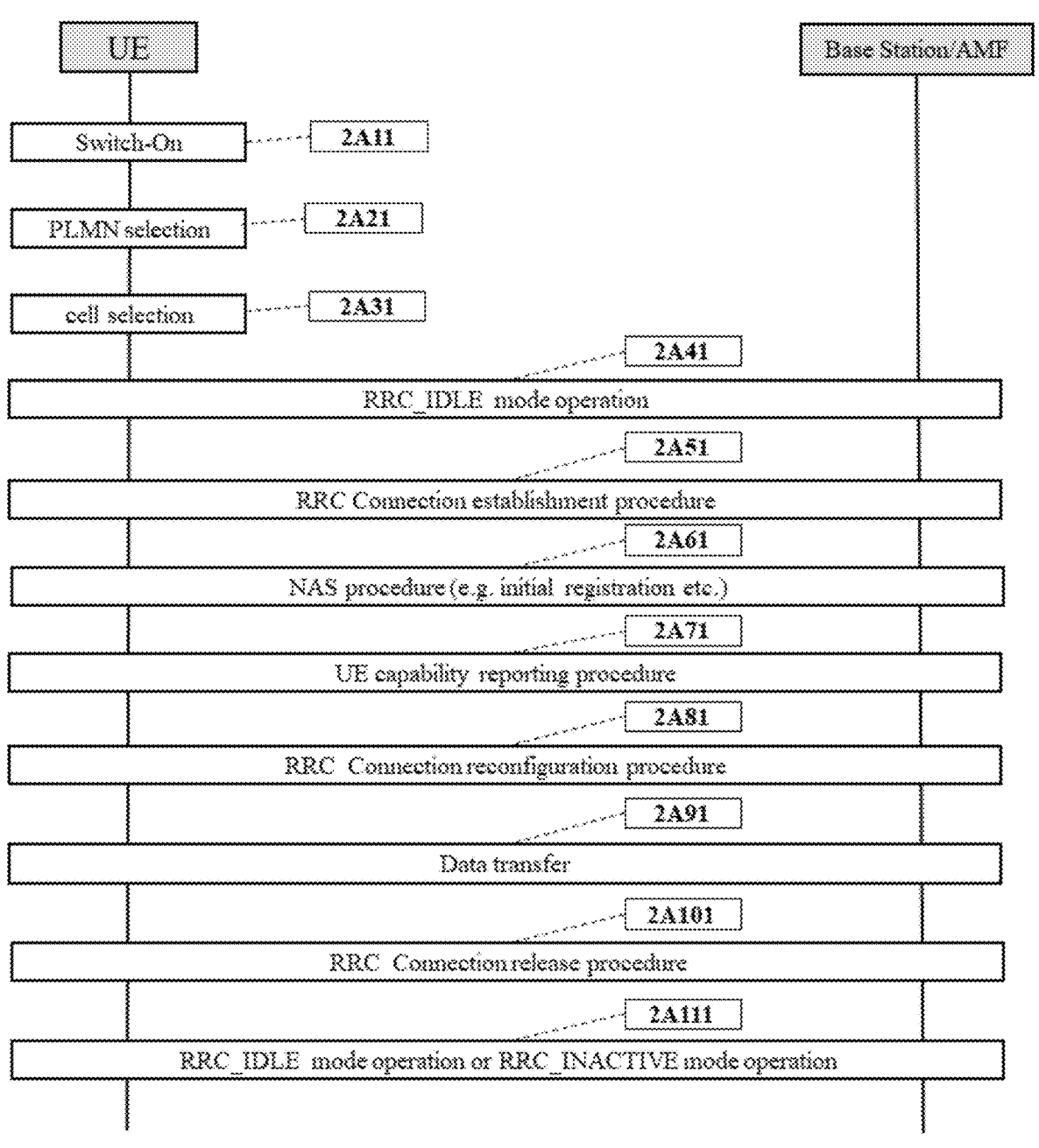
FIG. 2A is a diagram illustrating overall operation of the UE and network.

FIG. 2A illustrates overall operation of the UE and network.

Upon switch-on of the wireless device (e.g. UE) 2A11, UE performs PLMN selection 2A21 to select the carrier that is provided by the PLMN that UE is allowed to register.

Then UE performs cell selection 2A31 to camp on a suitable cell.

Once camping on a suitable cell, UE performs RRC_IDLE mode operation 2A41 such as paging channel monitoring and cell reselection and system information acquisition.

UE performs RRC Connection establishment procedure 2A51 to perform e.g. NAS procedure such as initial registration with the selected PLMN.

After successful RRC connection establishment, UE performs NAS procedure 2A61 by transmitting a corresponding NAS message via the established RRC connection (e.g. SRB1).

The base station can trigger UE capability reporting procedure 2A71 before configuring data bearers and various MAC functions.

The base station and the UE perform RRC connection reconfiguration procedure 2A81. Via the procedure, data radio bearers and logical channels and various MAC functions (such as DRX and BSR and PHR and beam failure reporting etc.) and various RRC functions (such as RRM and RLM and measurement etc.) are configured.

The base station and the UE perform data transfer 2A91 via the established radio bearers and based on configured MAC functions and configured RRC functions.

If geographical location of UE changes such that e.g. the current serving cell is no longer providing suitable radio condition, the base station and the UE perform cell level mobility such as handover or conditional reconfiguration or lower layer triggered mobility.

When RRC connection is no longer needed for the UE because of e.g. no more traffic available for the UE, the base station and the UE perform RRC connection release procedure 2A101. The base station can transit UE state either to RRC_IDLE (if the data activity of the UE is expected low) or to RRC_INACTIVE (if the data activity of the UE is expected high).

The UE performs either RRC_IDLE operation or RRC_INACTIVE mode operation 2A111 until the next event to RRC connection establishment/resumption occurs.

Figure 2B:
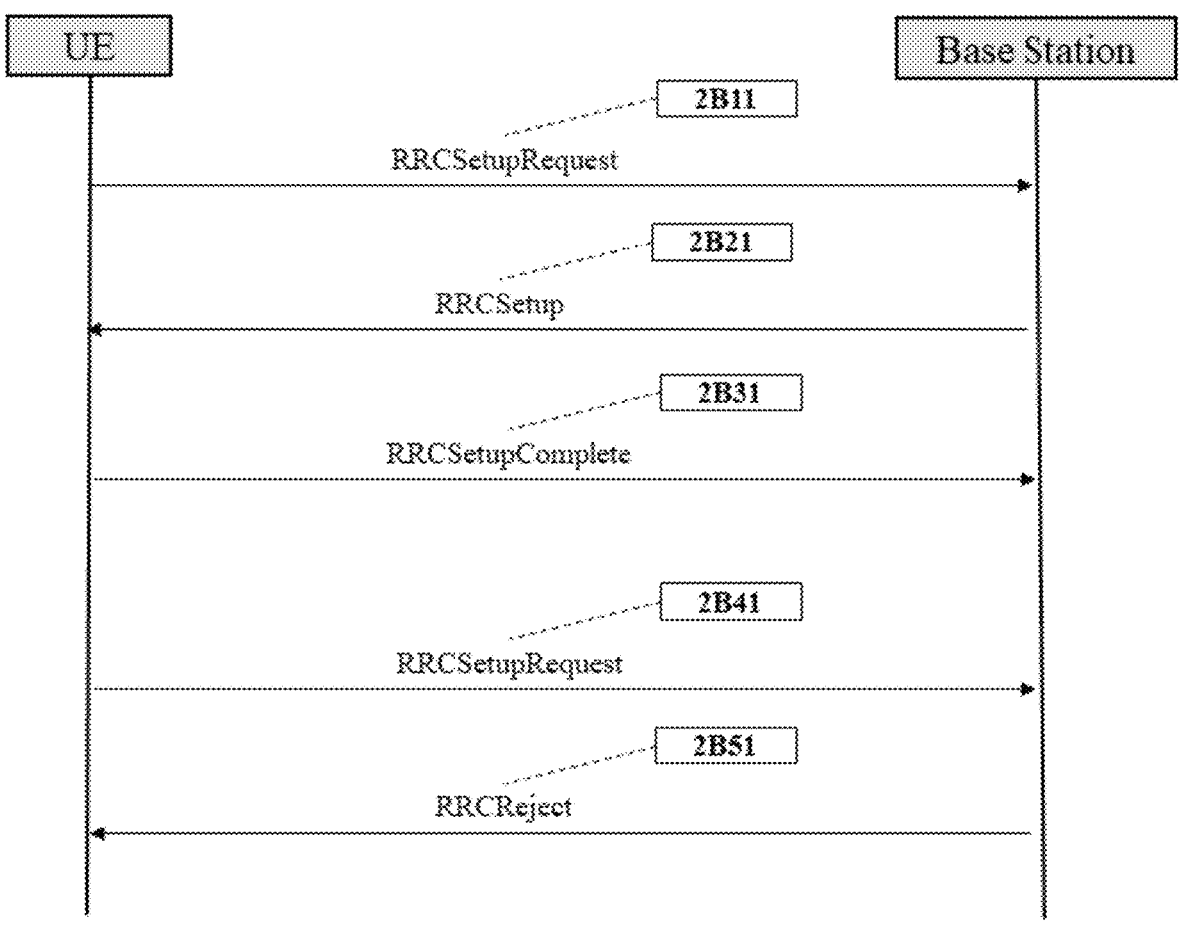
FIG. 2B illustrates RRC connection establishment procedure.

FIG. 2B illustrates RRC connection establishment procedure.

Successful RRC connection establishment procedure comprises:

>1: transmission of RRCSetupRequest by the UE 2B11;

>1: reception of RRCSetup by the UE 2B21;

>1: transmission of RRCSetupComplete by the UE 2B31.

Unsuccessful RRC connection establishment procedure comprises:

>1: transmission of RRCSetupRequest by the UE 2B41;

>1: reception of RRCReject by the UE 2B51;

RRCSetupRequest comprises following fields and IEs:

>1: ue-Identity field contains InitialUE-Identity IE which contains:

>>2: ng-5G-S-TMSI-Part1 field containing a BIT STRING of 39 bit;

>1: establishmentCause field contains EstablishmentCause IE which contains:

>>2 enumerated value indicating either emergency, highPriorityAccess, mt-Access, mo-Signalling, mo-Data, mo-VoiceCall, mo-VideoCall, mo-SMS, mps-PriorityAccess, mcs-Priority Access etc RRCSetup comprises following fields and IEs:

>1: radioBearerConfig field containing a RadioBearerConfig IE;

>1: masterCellGroup field containing a CellGroupConfig IE.

RRCSetupComplete comprises following fields and IEs:

>1: selectedPLMN-Identity field containing an integer indicating selected PLMN;

>1: dedicatedNAS-Message field containing a DedicatedNAS-Message which may contain various NAS message;

>1: ng-5G-S-TMSI-Part2 field containing a BIT STRING of 9 bit.

RRCSetupRequest is transmitted via CCCH/SRB0, which means that the base station does not identify UE transmitting the message based on DCI that scheduling the uplink transmission. The UE includes a field (ue-Identity) in the message so that the base station identify the UE. If 5G-S-TMSI is available (e.g. UE has already registered to a PLMN), the UE sets the field with part of the 5G-S-TMSI. If 5G-S-TMSI is not available (e.g. UE has not registered to any PLMN), the UE sets the field with 39-bit random value.

Upon reception of RRCSetup, UE configures cell group and SRB1 based on the configuration information in the RRCSetup. The UE perform following actions:

>1: perform the cell group configuration procedure in accordance with the received masterCellGroup;

>1: perform the radio bearer configuration procedure in accordance with the received radioBearerConfig;

>1: if stored, discard the cell reselection priority information provided by the cellReselectionPriorities or inherited from another RAT;

>1: enter RRC_CONNECTED;

>1: stop the cell re-selection procedure;

>1: consider the current cell to be the PCell;

The UE transmits to the base station RRCSetupComplete after performing above actions.

Figure 2C:
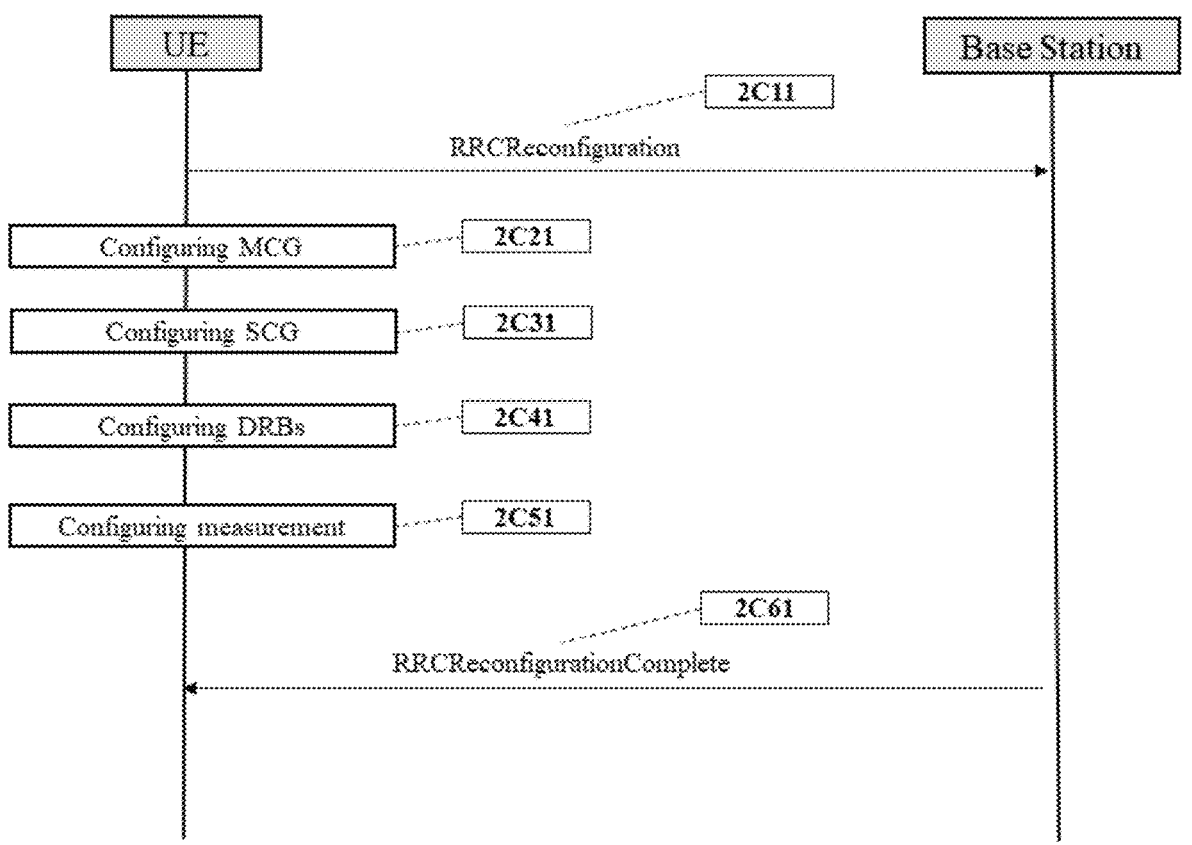
FIG. 2C illustrates RRC connection reconfiguration procedure.

The UE sets the contents of RRCSetupComplete message as follows:

>1: set the ng-5G-S-TMSI-Value to ng-5G-S-TMSI-Part2;

>1: set the selectedPLMN-Identity to the PLMN selected by upper layers from the plmn-IdentityInfoList;

>1: include the s-NSSAI-List and set the content to the values provided by the upper layers;

FIG. 2C illustrates RRC connection reconfiguration procedure.

Based on the reported capability and other factors such as required QoS and call admission control etc, the base station performs RRC reconfiguration procedure with the UE.

RRC reconfiguration procedure is a general purposed procedure that are applied to various use cases such as data radio bearer establishment, handover, cell group reconfiguration, DRX configuration, security key refresh and many others.

RRC reconfiguration procedure consists of exchanging RRCReconfiguration 2C11 and RRCReconfigurationComplete 2C61 between the base station and the UE.

RRCReconfiguration may comprise following fields and IEs:

>1: rrc-TransactionIdentifier field contains a RRC-TransactionIdentifier IE;

>1: radioBearerConfig field contains a RadioBearerConfig IE;

>>2: radioBearerConfig field comprises configuration information for SRBs and DRBs via which RRC messages and user traffic are transmitted and received;

>1: secondaryCellGroup field contains a CellGroupConfig IE;

>>2: secondaryCellGroup field comprises configuration information for secondary cell group;

>>2: A cell group consists of a SpCell and zero or more SCells;

>>2: Cell group configuration information comprises cell configuration information for SpCell/SCell and configuration information for MAC and configuration information for logical channel etc;

>1: measConfig field contains a MeasConfig IE;

>>2: measConfig field comprises configuration information for measurements that the UE is required to perform for mobility and other reasons.

>1: masterCellGroup field contains a CellGroupConfig IE;

Upon reception of RRCReconfiguration, UE processes the IEs in the order as below. UE may:

>1: perform the cell group configuration for MCG based on the received masterCellGroup 2C21;

>1: perform the cell group configuration for SCG based on the received secondaryCellGroup 2C31;

>1: perform the radio bearer configuration based on the received radioBearerConfig 2C41;

>1: perform the measurement configuration based on the received measConfig 2C51;

After performing configuration based on the received IEs/fields, the UE transmits the RRCReconfigurationComplete to the base station. To indicate that the RRCReconfigurationComplete is the response to RRCReconfiguration, UE sets the TransactionIdentifier field of the RRCReconfigurationComplete with the value indicated in TransactionIdentifier field of the RRCReconfiguration.

Figure 2D:
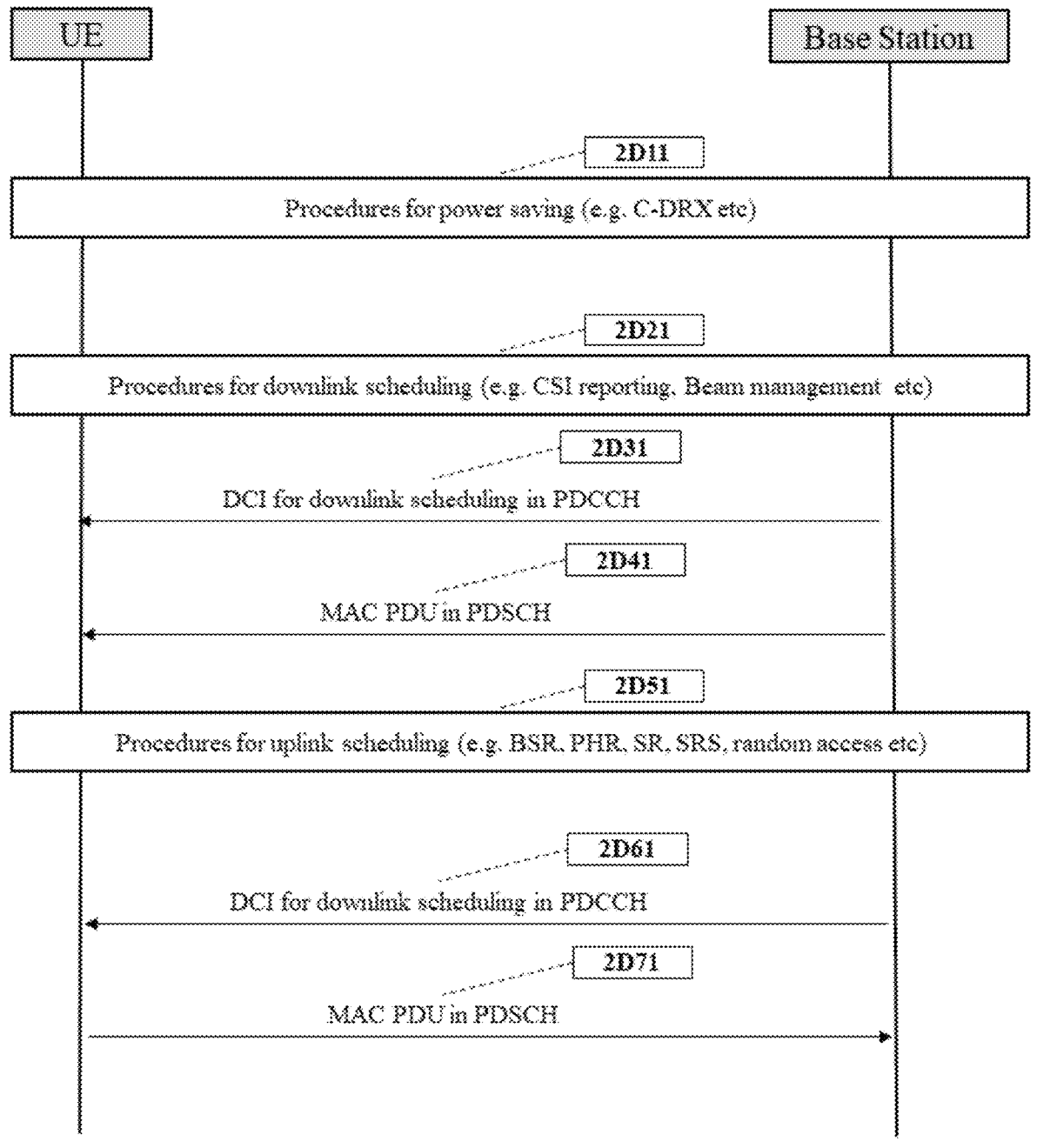
FIG. 2D illustrates data transfer procedure in RRC_CONNECTED state.
Figure 2E:
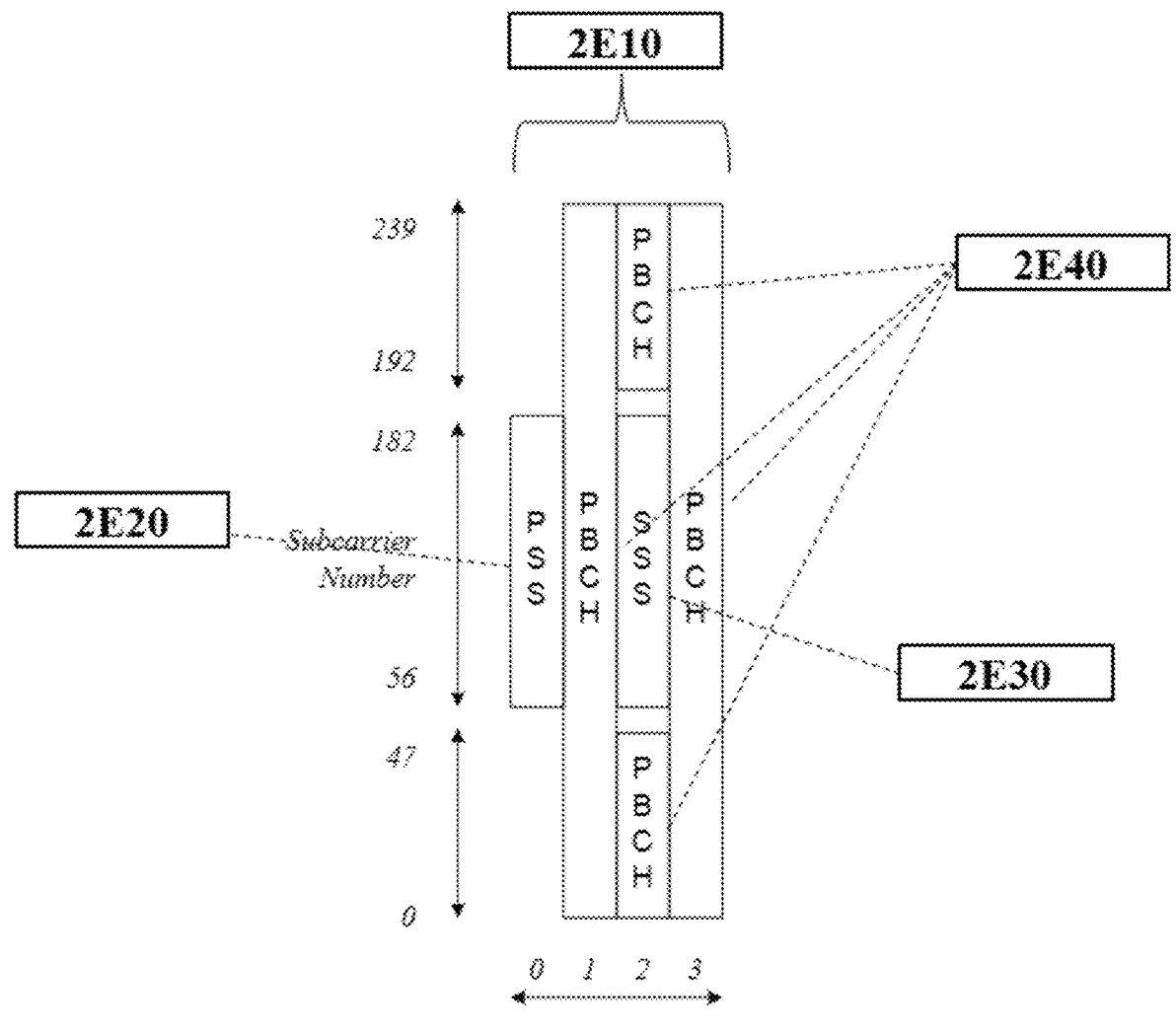
FIG. 2E illustrates SSB.

FIG. 2D illustrates data transfer procedure in RRC_CONNECTED state.

The UE and the base station may perform procedures for power saving such as C-DRX 2D11. The configuration information for C-DRX is provided to the UE within cell group configuration in the RRCReconfiguration.

The UE and the base station may perform various procedures for downlink scheduling 2D21 such as CSI reporting and beam management. The configuration information for CSI reporting is provided to the UE within cell group configuration in the RRCReconfiguration. Beam management is performed across RRC layer and MAC layer and PHY layer. Beam related information is configured via cell group configuration information within RRCReconfiguration. Activation and deactivation of beam is performed by specific MAC CEs.

Based on the reported CSI and downlink traffic for the UE, the base station determines the frequency/time resource and transmission format for downlink transmission. The base station transmits to the UE DCI containing downlink scheduling information via PDCCH 2D31. The base station transmits to the UE PDSCH corresponding to the DCI and containing a MAC PDU 2D41.

The UE and the base station may perform various procedure for uplink scheduling 2D51 such as buffer status reporting and power headroom reporting and scheduling request and random access. The configuration information for those procedures are provided to the UE in cell group configuration information in RRCReconfiguration.

Based on the uplink scheduling information reported by the UE, the base station determines the frequency/time resource and transmission format for uplink transmission. The base station transmits to the UE DCI containing uplink scheduling information via PDCCH 2D61. The base station transmits to the UE PDSCH corresponding to the DCI and containing a MAC PDU 2D71.

The Synchronization Signal and PBCH block (SSB) 2E10 consists of primary synchronization signals (PSS) 2E20 and secondary synchronization signals (SSS) 2E30, PSS and SSS occupies 1 symbol and 127 subcarriers. PBCH 2E40 spans across 3 OFDM symbols and 240 subcarriers The possible time locations of SSBs within a half-frame are determined by sub-carrier spacing and the periodicity of the half-frames where SSBs are transmitted is configured by the network. During a half-frame, different SSBs may be transmitted in different spatial directions (i.e. using different beams, spanning the coverage area of a cell).

In this disclosure, following terminologies are used.

Associated ID (A-ID): An integer managed by a network entity such as GNB to keep the consistency of AIML operation. The A-ID represents scenario, RAN configuration and network conditions. UE and Network determine whether a AIML model/functionality is applicable based on the A-ID associated with the AIML model/functionality. UE may assume the similar properties of a DL Tx beam or beam set/list associated with the same associated ID. UE may assume the same number/order of DL Tx beams with the same associated ID. A-ID may be unique within a PLMN. An A-ID consists with PLMN-ID part and AMF-ID part and GNB-ID part and local identifier. The local identifier part may consist with cell-id part and cell-specific local identifier part. Alternatively, A-ID consists with OTT server ID part and local identifier part. The OTT server refers to network entity where AIML model training and AIML management function reside.

Instead of full A-ID, a short A-ID can be indicated in the DCI/MAC CE. The mapping between the full A-ID and the short A-ID can be explicitly indicated in the RRCReconfiguration message (for example. Alternatively, the mapping can be done based on a predefined rule (e.g. the last n bit of full A-ID is corresponding short A-ID; the part that are assigned by the base station (e.g. GNB-ID part+local identifier) is short A-ID; cell-specific local identifier field; the part that are assigned by the operator etc).

Training profile information: Set of information for an AIML model that is used by UE to determine whether the AIML model is applicable or not. It comprises A-ID and time/frequency information related to trained resource (e.g. periodicity of Set A resource; periodicity of Set B resource; frequency region for Set A resource, frequency region for Set B resource etc.)

AIML model inference operation:

BM1: Spatial-domain Downlink beam prediction for Set A of beams based on measurement results of Set B of beams

BM2: Temporal Downlink beam prediction for Set A of beams based on the historic measurement results of Set B of beams virtual CSI-RS (reference signal): CSI-RS resource that is used for AIML model inference operation. CSI-RS is not transmitted on the virtual CSI-RS resource. Virtual CSI-RS resource is configured by CSI resource configuration for which CSI resource type is set to a specific value (e.g. virtual/inference)

measurement_based_CSI_reporting: CSI reporting that is configured with a CSI resource configuration that is used both for measurement and for channel state information determination.

inference_based_CSI_reporting: CSI reporting that is configured with first CSI resource configuration for measurement and second CSI resource configuration for channel state information determination (e.g. AIML model inference). CSI report for inference_based_CSI_reporting contains channel state information for the second CSI resource configuration. It is equivalent to AIML based CSI reporting.

Hybrid_CSI_reporting: CSI reporting that is configured with first CSI resource configuration for measurement/channel state information determination and second CSI resource configuration for channel state information determination only (e.g. AIML model inference).

CSI report for Hybrid_CSI_reporting contains channel state information for the first CSI resource configuration and channel state information for the second CSI resource configuration.

CSI: Channel State Information refers to information about the state of the communication channel between the base station (gNB) and the user equipment (UE). CSI may comprise Channel Quality Indicator (CQI), Precoding Matrix Indicator (PMI), Rank Indicator (RI), CSI-RS Resource Indicator (CRI), SS/PBCH Block Resource Indicator (SSBRI), Layer Indicator (LI) and L1-RSRP.

AI/ML-enabled Feature: refers to a Feature where AI/ML may be used.

AI/ML Model: A data driven algorithm that applies AI/ML techniques to generate a set of outputs based on a set of inputs.

AI/ML model delivery: A generic term referring to delivery of an AI/ML model from one entity to another entity in any manner.

AI/ML model Inference: A process of using a trained AI/ML model to produce a set of outputs based on a set of inputs.

AI/ML model testing: A subprocess of training, to evaluate the performance of a final AI/ML model using a dataset different from one used for model training and validation. Differently from AI/ML model validation, testing does not assume subsequent tuning of the model.

AI/ML model training: A process to train an AI/ML Model [by learning the input/output relationship] in a data driven manner and obtain the trained AI/ML Model (and associated AID) for inference.

AI/ML model transfer: Delivery of an AI/ML model over the air interface in a manner that is not transparent to 3GPP signalling, either parameters of a model structure known at the receiving end or a new model with parameters. Delivery may contain a full model or a partial model.

AI/ML model validation: A subprocess of training, to evaluate the quality of an AI/ML model using a dataset different from one used for model training, that helps selecting model parameters that generalize beyond the dataset used for model training.

Data collection: A process of collecting data by the network nodes, management entity, or UE for the purpose of AI/ML model training, data analytics and inference.

Federated learning/federated training: A machine learning technique that trains an AI/ML model across multiple decentralized edge nodes (e.g., UEs, gNBs) each performing local model training using local data samples. The technique requires multiple interactions of the model, but no exchange of local data samples.

Functionality identification: A process/method of identifying an AI/ML functionality for the common understanding between the NW and the UE. Note: Information regarding the AI/ML functionality may be shared during functionality identification. Where AI/ML functionality resides depends on the specific use cases and sub use cases.

Management instruction: Information needed to ensure proper inference operation. This information may include selection/(de) activation/switching of AI/ML models or AI/ML functionalities, fallback to non-AI/ML operation, etc.

Model activation: enable an AI/ML model for a specific AI/ML-enabled feature.

Model deactivation: disable an AI/ML model for a specific AI/ML-enabled feature.

training-inference pair (TIP): It is a pair of AIML functionality/AIML model and an A-ID. It represents an AIML functionality/model which is trained under the circumstances represented by the AID. AIML is configured/activated/deactivated and resumed by TIP.

applicable training-inference pair (AIML model): a TIP that is applicable at a given circumstances. A TIP of which AID and AIML function/model are available both in the UE and in the GNB.

RRC-TransactionIdentifier: The RRC-TransactionIdentifier is a unique identifier for RRC transactions between the User Equipment (UE) and the network. The RRC-TransactionIdentifier is used, together with the message type, to identify specific RRC procedures or transactions. It helps in pairing request and response messages in RRC procedures, ensuring proper message handling and avoiding confusion between different ongoing procedures.

training resource: resource collectively refers to resource for downlink reference signal resource and downlink reference signal transmitted/received on the resource. Training resource is resource configured/activated for AIML model training purpose.

source training resource: source training resource is training resource for input beams.

target training resource: target training resource is training resource for output beams.

Followings are used interchangeably:

TIP and inference_based_CSI_report configuration and inference_based_CSI_reporting synchronous reconfiguration and reconfiguration with sync and cell level mobility and handover target cell and new SpCell and new PCell and target SpCell and target PCell

AIML model and AIML function and AIML feature input beam and Set B beam and source beam and source training resource;

output beam and Set A beam and target beam and target training resource;

resource may mean a CSI-RS resource or a SSB.

Figure 3A:
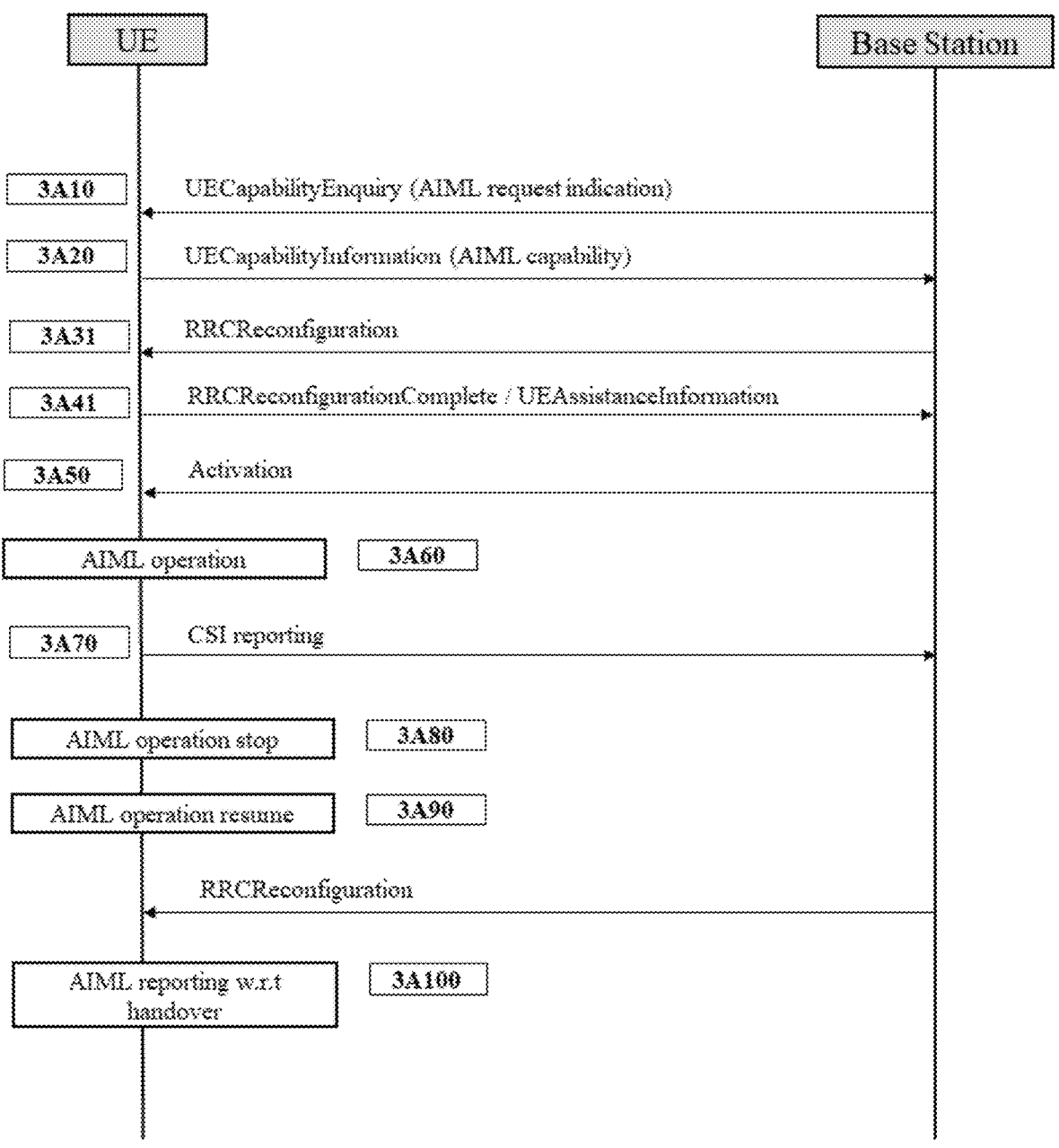
FIG. 3A illustrates overall operation of the UE and network for AIML operation.

FIG. 3A illustrates operations of UE and GNB for AIML inference operation for beam management.

At 3A10, UE receives from GNB UECapabilityEnquiry message. The UECapabilityEnquiry message comprises information related to AIML capability. The UECapability-Enquiry message comprises a UE-CapabilityRAT-Request-List. The IE UE-CapabilityRAT-RequestList is used to request UE capabilities for one or more RATs from the UE.

UE-CapabilityRAT-Request::=SEQUENCE {
    rat-Type RAT-Type,
    capabilityRequestFilter    OCTET    STRING    OPTIO-
      NAL, --Need N
    . . .
    } capabilityRequestFilter is information by which the network requests the UE to filter the UE capabilities. For rat-Type set to nr or eutra-nr: the encoding of the capabilityRequestFilter is defined in UE-CapabilityRequestFilterNR. rat-Type indicates the RAT type for which the NW requests UE capabilities.

UE-CapabilityRequestFilterNR-v1910::=SEQUENCE
    {
    aimlRequest-r19    ENUMERATED    {true}    OPTIO-
      NAL, --Need N
    nonCriticalExtension SEQUENCE { } OPTIONAL
    }

If the aimlRequest field is comprised in the UECapabilityEnquiry message, UE includes AIML related capability information in the UE-NR-Capability in the UECapabilityInformation message.

At 3A20, UE transmits to GNB UECapabilityInformation message.

UECapabilityInformation::=SEQUENCE {
    rrc-TransactionIdentifier RRC-TransactionIdentifier,
    criticalExtensions CHOICE {
      ueCapabilityInformation    UECapabilityInformation-
        IEs,
      criticalExtensionsFuture SEQUENCE { }
    }
    }
    }
    UECapabilityInformation-IEs::=SEQUENCE {
    ue-CapabilityRAT-ContainerList    UE-CapabilityRAT-
      ContainerList OPTIONAL,
    lateNonCriticalExtension OCTET STRING OPTIONAL,
    nonCriticalExtension SEQUENCE { } OPTIONAL}
    }

The IE UE-CapabilityRAT-ContainerList contains a list of radio access technology specific capability containers.

UE-CapabilityRAT-Container::=SEQUENCE {
    rat-Type RAT-Type,
    ue-CapabilityRAT-Container OCTET STRING
    } ue-CapabilityRAT-Container is container for the UE capabilities of the indicated RAT. The encoding is defined in the specification of each RAT:

For rat-Type set to nr, the encoding of UE capabilities is defined in UE-NR-Capability. For rat-Type set to eutra-nr, the encoding of UE capabilities is defined in UE-MRDC-Capability.

In case that UE-CapabilityRAT-Request with rat-Type set to NR was included in UECapabilityEnquiry message, UE generates UE-NR-Capability IE and includes it in UECapabilityInformation message.

The IE UE-NR-Capability is used to convey the NR UE Radio Access Capability Parameters. In case that the UE-CapabilityRAT-Request with rat-Type set to NR comprises aimlRequest field, UE includes aiml-Parameters field (comprising AIML-Parameters IE) in the UE-NR-Capability IE.

The IE AIML-Parameters is used to convey the subset of UE Radio Access Capability Parameters that apply to AIML integrated to NR. The IE may comprise:

list of AIML functions that is controlled by RAN node
      (e.g. BM1, BM2 etc)
    #list of IDs of AIML models per supported AIML function
    #list of A-IDs per supported AIML model
    #list of TIPs that are supported by the terminal Based on the AIML-Parameters, GNB decides to configure some of AIML functions/models (e.g. specific AIML function/model for BM1). GNB includes related configuration parameters in RRCReconfiguration message. GNB transmits the RRCReconfiguration message to the UE.

At 3A31, UE receives from GNB RRCReconfiguration message. The RRCReconfiguration message configuration parameters for one or more serving cells. The message may comprise one or more ServingCellConfig IEs. The IE ServingCellConfig (set of configuration parameters for a serving cell) is used to configure (add or modify) the UE with a serving cell, which may be the SpCell or an SCell of an MCG or SCG.

--ASN1START
    --TAG-SERVINGCELLCONFIG-START

ServingCellConfig::=SEQUENCE {
tdd-UL-DL-ConfigurationDedicated TDD-UL-DL-ConfigDedicated
initialDownlinkBWP BWP-DownlinkDedicated
downlinkBWP-ToReleaseList SEQUENCE (SIZE (1 . . . maxNrofBWPs)) OF BWP-Id
downlinkBWP-ToAddModList SEQUENCE (SIZE (1 . . . maxNrofBWPs)) OF BWP-Downlink
firstActiveDownlinkBWP-Id BWP-Id
bwp-InactivityTimer ENUMERATED {ms2, ms3, ms4, ms5, ms6, ms8, ms10, ms20, ms30, . . . }
defaultDownlinkBWP-Id BWP-Id
uplinkConfig UplinkConfig
supplementaryUplink UplinkConfig
pdcch-ServingCellConfig SetupRelease {PDCCH-ServingCellConfig}
pdsch-ServingCellConfig SetupRelease {PDSCH-ServingCellConfig}
csi-MeasConfig SetupRelease {CSI-MeasConfig}
sCellDeactivationTimer ENUMERATED {ms20, ms40, . . . }
crossCarrierSchedulingConfig CrossCarrierSchedulingConfig
tag-Id TAG-Id,
. . . , bwp-InactivityTimer field indicates the duration in ms after which the UE falls back to the default Bandwidth Part. When the network releases the timer configuration, the UE stops the timer without switching to the default BWP.

defaultDownlinkBWP-Id field indicates the initial bandwidth part is referred to by BWP-Id=0. ID of the downlink bandwidth part to be used upon expiry of the BWP inactivity timer. This field is UE specific. When the field is absent the UE uses the initial BWP as default BWP.

downlinkBWP-ToAddModList field indicates list of additional downlink bandwidth parts to be added or modified.

downlinkBWP-ToReleaseList field indicates list of additional downlink bandwidth parts to be released.

firstActiveDownlinkBWP-Id field indicates, if configured for an SpCell, the ID of the DL BWP to be activated or to be used for RLM, BFD and measurements upon performing the RRC (re-)configuration.

The IE CSI-MeasConfig is used to configure CSI-RS (reference signals) belonging to the serving cell in which CSI-MeasConfig is included, channel state information reports to be transmitted on PUCCH on the serving cell in which CSI-MeasConfig is included and channel state information reports on PUSCH triggered by DCI received on the serving cell in which CSI-MeasConfig is included. The IE CSI-MeasConfig is also used to configure virtual CSI-RS (reference signals) belonging to the serving cell in which CSI-MeasConfig is included.

CSI-MeasConfig::=SEQUENCE {
nzp-CSI-RS-ResourceToAddModList SEQUENCE (SIZE (1 . . . maxNrofNZP-CSI-RS-Resources)) OF NZP-CSI-RS-Resource
nzp-CSI-RS-ResourceToReleaseList SEQUENCE (SIZE (1 . . . maxNrofNZP-CSI-RS-Resources)) OF NZP-CSI-RS-ResourceId
nzp-CSI-RS-ResourceSetToAddModList SEQUENCE (SIZE (1 . . . maxNrofNZP-CSI-RS-ResourceSets)) OF NZP-CSI-RS-ResourceSet
nzp-CSI-RS-ResourceSetToReleaseList SEQUENCE (SIZE (1 . . . maxNrofNZP-CSI-RS-ResourceSets)) OF NZP-CSI-RS-ResourceSetId
csi-IM-ResourceToAddModList SEQUENCE (SIZE (1 . . . maxNrofCSI-IM-Resources)) OF CSI-IM-Resource csi-IM-ResourceToReleaseList SEQUENCE (SIZE (1 . . . maxNrofCSI-IM-Resources)) OF CSI-IM-ResourceId
csi-IM-ResourceSetToAddModList SEQUENCE (SIZE (1 . . . maxNrofCSI-IM-ResourceSets)) OF CSI-IM-ResourceSet
csi-IM-ResourceSetToReleaseList SEQUENCE (SIZE (1 . . . maxNrofCSI-IM-ResourceSets)) OF CSI-IM-ResourceSetId
csi-SSB-ResourceSetToAddModList SEQUENCE (SIZE (1 . . . maxNrofCSI-SSB-ResourceSets)) OF CSI-SSB-ResourceSet
csi-SSB-ResourceSetToReleaseList SEQUENCE (SIZE (1 . . . maxNrofCSI-SSB-ResourceSets)) OF CSI-SSB-ResourceSetId
csi-ResourceConfigToAddModList SEQUENCE (SIZE (1 . . . maxNrofCSI-ResourceConfigurations)) OF CSI-ResourceConfig
csi-ResourceConfigToReleaseList SEQUENCE (SIZE (1 . . . maxNrofCSI-ResourceConfigurations)) OF CSI-ResourceConfigId
csi-ReportConfigToAddModList SEQUENCE (SIZE (1 . . . maxNrofCSI-ReportConfigurations)) OF CSI-ReportConfig OPTIONAL, --Need N
csi-ReportConfigToReleaseList SEQUENCE (SIZE (1 . . . maxNrofCSI-ReportConfigurations)) OF CSI-ReportConfigId
reportTriggerSize INTEGER (0 . . . 6)
aperiodicTriggerStateList SetupRelease {CSI-AperiodicTriggerStateList}
semiPersistentOnPUSCH-TriggerStateList SetupRelease {CSI-SemiPersistentOnPUSCH-TriggerStateList}
. . . ,
--TAG-CSI-MEASCONFIG-STOP
--ASN1STOP
csi-IM-ResourceSetToAddModList field indicates pool of CSI-IM-ResourceSet which can be referred to from CSI-ResourceConfig or from MAC CEs.

csi-IM-ResourceToAddModList field indicates pool of CSI-IM-Resource which can be referred to from CSI-IM-ResourceSet.

csi-ReportConfigToAddModList field indicates configured CSI report settings.

csi-ResourceConfigToAddModList field indicates configured CSI resource settings.

csi-SSB-ResourceSetToAddModList field indicates pool of CSI-SSB-ResourceSet which can be referred to from CSI-ResourceConfig.

nzp-CSI-RS-ResourceSetToAddModList field indicates pool of NZP-CSI-RS-ResourceSet which can be referred to from CSI-ResourceConfig or from MAC CEs.

nzp-CSI-RS-ResourceToAddModList field indicates pool of NZP-CSI-RS-Resource which can be referred to from NZP-CSI-RS-ResourceSet.

reportTriggerSize field indicates size of CSI request field in DCI (bits). The field reportTriggerSize applies to DCI format 0_1 and the field reportTriggerSizeDCI-0-2 applies to DCI format 0_2.

GNB can configure UE with one or more candidate AIML functions using RRCReconfiguration procedure. To configure AI/ML for beam management for one or more serving cells, GNB includes in the RRCReconfiguration message relevant parameters.

To perform AIML based BM1 for a target serving cell, GNB indicates candidate AIML based BM1 parameters in:
the CSI-MeasConfig of the target serving cell; and
the CSI-MeasConfig of a special cell, wherein the special cell is a cell configured with PUCCH.

In the CSI-MeasConfig of the target serving cell, GNB includes one or more CSI-ResourceConfig IEs. The IE CSI-ResourceConfig defines a group of one or more NZP-CSI-RS-ResourceSet, CSI-IM-ResourceSet and/or CSI-SSB-ResourceSet. The IE CSI-ResourceConfig defines either CSI-RS resource for Set A (CSI-RS configuration for CSI inference) or CSI-RS resource for Set B (CSI-RS configuration for CSI measurement).

```
--ASN1START
--TAG-CSI-RESOURCECONFIG-START
CSI-ResourceConfig::=SEQUENCE {
csi-ResourceConfigId CSI-ResourceConfigId,
csi-RS-ResourceSetList CHOICE {
    nzp-CSI-RS-SSB SEQUENCE {
        nzp-CSI-RS-ResourceSetList SEQUENCE (SIZE
            (1 . . . maxNrofNZP-CSI-RS-ResourceSetsPer-
            Config)) OF NZP-CSI-RS-ResourceSetId
            OPTIONAL, --Need R
            csi-SSB-ResourceSetList SEQUENCE (SIZE (1 . . .
            maxNrofCSI-SSB-ResourceSetsPerConfig)) OF
            CSI-SSB-ResourceSetId OPTIONAL --Need R
    },
    csi-IM-ResourceSetList SEQUENCE (SIZE (1 . . .
        maxNrofCSI-IM-ResourceSetsPerConfig)) OF CSI-
        IM-ResourceSetId
},
bwp-Id BWP-Id,
resourceType ENUMERATED {aperiodic, semiPersis-
    tent, periodic},
. . . ,
[[
csi-SSB-ResourceSetListExt-r17        CSI-SSB-Resource-
    SetId OPTIONAL --Need R
]]
[[
resourceTypeExt ENUMERATED
{forInferrence/virtual}OPTIONAL --Need R,
associatedId AssociatedId OPTIONAL --Need R
]]
}
--TAG-CSI-RESOURCECONFIG-STOP
--ASN1STOP
``` bwp-Id field indicates the DL BWP which the CSI-RS associated with this CSI-ResourceConfig are located in.

csi-IM-ResourceSetList field indicates list of references to CSI-IM resources used for CSI measurement and reporting in a CSI-RS resource set.

csi-SSB-ResourceSetList field indicates list of references to SSB resources used for CSI measurement and reporting and CSI inference in a CSI-RS resource set.

nzp-CSI-RS-ResourceSetList field indicates list of references to NZP CSI-RS resources used for beam measurement and reporting and CSI inference in a CSI-RS resource set.

resourceType field indicates time domain behavior of resource configuration. It does not apply to resources provided in the csi-SSB-ResourceSetList.

resourceTypeExt field indicates whether the resource configuration is for measurement or for inference. UE does not measure the CSI resource if resourceTypeExt field is present.

associatedId field indicates the A-ID associated with the resource configuration.

In the CSI-ResourceConfig for CSI-RS resource for Set A, resourceTypeExt and associatedId are comprised.

In the CSI-ResourceConfig for CSI-RS resource for Set B:

resourceTypeExt is not comprised; and associatedId is comprised.

In the CSI-ResourceConfig for normal CSI-RS resource, neither resourceType nor associatedId are comprised.

If resourceTypeExt is comprised in the CSI-ResourceConfig, UE ignores resourceType field, and UE determines the type of resource based on resourceTypeExt. If resourceTypeExt is not comprised in the CSI-ResourceConfig, UE determines the type of resource based on resourceType.

In the CSI-MeasConfig of the special cell (where PUCCH for CSI report is transmitted), GNB includes one or more CSI-ReportConfig IEs. The IE CSI-ReportConfig is used to configure a periodic or semi-persistent report sent on PUCCH on the cell in which the CSI-ReportConfig is included, or to configure a semi-persistent or aperiodic report sent on PUSCH triggered by DCI received on the cell in which the CSI-ReportConfig is included (in this case, the cell on which the report is sent is determined by the received DCI).

The IE CSI-ReportConfig defines:

measurement_based_CSI_report in case that CSI-ReportConfig does not comprise:

resourcesForChannelInference;

associatedId; and reportBothResource;

inference_based_CSI_report in case that CSI-ReportConfig:

comprises resourceForChannelInference and associatedId; and does not comprise reportBothResource;

Hybrid_CSI_report on PUCCH in case that CSI-ReportConfig comprises:

resourceForChannelInference;

associatedId; and reportBothResource.

```
--ASN1START
--TAG-CSI-REPORTCONFIG-START
CSI-ReportConfig::=SEQUENCE {
reportConfigId CSI-ReportConfigId,
carrier ServCellIndex OPTIONAL, --Need S
resourcesForChannelMeasurement        CSI-ResourceCon-
    figId, ///pointer to CSI-ResourceConfig for CSI-RS
    resource for Set B///
resourcesForChannelInference        CSI-ResourceConfigId,
    OPTIONAL, ///pointer to CSI-ResourceConfig for
    CSI-RS resource for Set A///
associatedId AssociatedId OPTIONAL --Need R/// this
    field indicates associated ID of the AIML model/func-
    tionality associated with the CSI-ReportConfig IE. UE
    uses this field to determine the AIML model associated
    with the CSI-ReportConfig. it is used to indicate the
    AIML model/functionality in RRC message///
shortAID ShortAID OPTIONAL --Need R/// this field
    indicates short associated ID of the AIML model/
    functionality associated with the CSI-ReportConfig IE.
    It is used to indicate the AIML model/functionality in
    MAC CE or in DCI///
reportBothResource        ENUMERATED        {enabled}
    OPTIONAL ///if present, CSI report contains
    reportQuantity for resourceForChannelMeasurement
    and reportQuantity for resourceForChannelinference///
reportConfigType CHOICE {
    periodic SEQUENCE {
        reportSlotConfig CSI-ReportPeriodicityAndOffset,
        pucch-CSI-ResourceList SEQUENCE (SIZE (1 . . .
            maxNrofBWPs)) OF PUCCH-CSI-Resource
    },
```

```
semiPersistentOnPUCCH SEQUENCE {
    reportSlotConfig CSI-ReportPeriodicityAndOffset,
    pucch-CSI-ResourceList SEQUENCE (SIZE (1 . . .
        maxNrofBWPs)) OF PUCCH-CSI-Resource
},
semiPersistentOnPUSCH SEQUENCE {
    reportSlotConfig ENUMERATED {sl5, sl10, sl20,
        sl40, sl80, sl160, sl320},
    reportSlotOffsetList SEQUENCE (SIZE (1 . . .
        maxNrofUL-Allocations)) OF INTEGER (0 . . .
        32),
    p0alpha P0-PUSCH-AlphaSetId
},
aperiodic SEQUENCE {
    reportSlotOffsetList SEQUENCE (SIZE (1 . . .
        maxNrofUL-Allocations)) OF INTEGER (0 . . .
        32)
    }
},
reportQuantity CHOICE {
    none NULL,
    cri-RI-PMI-CQI NULL,
    cri-RI-i1 NULL,
    cri-RI-i1-CQI SEQUENCE {
        pdsch-BundleSizeForCSI ENUMERATED {n2, n4}
            OPTIONAL --Need S
    },
    cri-RI-CQI NULL,
    cri-RSRP NULL,
    ssb-Index-RSRP NULL,
    cri-RI-LI-PMI-CQI NULL
},
timeRestrictionForChannelMeasurements      ENUMER-
    ATED {configured, notConfigured},
groupBasedBeamReporting CHOICE {
    enabled NULL,
    disabled SEQUENCE {
        nrofReportedRS ENUMERATED {n1, n2, n3, n4}
            OPTIONAL --Need S
    }
},
cqi-Table ENUMERATED {table1, table2, table3, table4-
    r17} OPTIONAL, --Need R
subbandSize ENUMERATED {value1, value2},
non-PMI-PortIndication SEQUENCE (SIZE (1 . . .
    maxNrofNZP-CSI-RS-ResourcesPerConfig))      OF
    PortIndexFor8Ranks OPTIONAL, --Need R
. . . ,
reportQuantity-r16 CHOICE {
    cri-SINR-r16 NULL,
    ssb-Index-SINR-r16 NULL
    }
OPTIONAL, --Need R
codebookConfig-r16  CodebookConfig-r16  OPTIONAL
    --Need R
]],
reportQuantity-r17 CHOICE {
    cri-RSRP-Index-r17 NULL,
    ssb-Index-RSRP-Index-r17 NULL,
    cri-SINR-Index-r17 NULL,
    ssb-Index-SINR-Index-r17 NULL
    }
OPTIONAL --Need R
    }
``` carrier field indicates in which serving cell the CSI-ResourceConfig indicated below are to be found. If the field is absent, the resources are on the same serving cell as this report configuration.

codebookConfig field indicates codebook configuration for Type-1 or Type-2 including codebook subset restriction.

cqi-FormatIndicator field indicates whether the UE shall report a single (wideband) or multiple (subband) CQI.

cqi-Table field indicates which CQI table to use for CQI calculation.

csi-IM-ResourcesForInterference field indicates CSI IM resources for interference measurement (in case that the CSI-ReportConfig is for measurement_based_CSI_report) or for interference inference (in case that the CSI-Report-Config is for inference_based_CSI_report). csi-Re-sourceConfigId of a CSI-ResourceConfig included in the configuration of the serving cell indicated with the field "carrier" above. The CSI-ResourceConfig indicated here contains only CSI-IM resources. The bwp-Id in that CSI-ResourceConfig is the same value as the bwp-Id in the CSI-ResourceConfig indicated by resourcesForChannelMeasurement.

csi-ReportingBand field indicates a contiguous or non-contiguous subset of subbands in the bandwidth part which CSI shall be reported for (in case that the CSI-ReportConfig is for measurement_based_CSI_report) or which CSI shall be inferred for (in case that the CSI-ReportConfig is for inference_based_CSI_report). Each bit in the bit-string represents one subband in order of frequency position in the BWP. The right-most bit in the bit string represents the lowest subband with the lowest frequency position in the BWP. The choice determines the number of subbands (subbands3 for 3 subbands, subbands4 for 4 subbands, and so on).

csi-ReportMode field configures the CSI report modes Mode 1 or Mode 2.

csi-ReportSubConfigToAddModList field indicates list of CSI-ReportSubConfiguration(s) in a CSI report configuration to add or modify.

csi-ReportSubConfigToReleaseList field indicates list of CSI-ReportSubConfiguration(s) in a CSI report configuration to release.

groupBasedBeamReporting field turn on/off group beam based reporting.

nrofReportedGroups field indicates number of reported resource groups per CSI-report. Value n1 means one resource group, n2 means 2 resource groups, and so on. If nrofReportedGroups is configured, the UE ignores groupBasedBeamReporting (without suffix).

nrofReportedRS field indicates:

the number (N) of measured RS resources to be reported per report setting in a non-group-based report (in case that the CSI-ReportConfig is for measurement_based_CSI_report); or the number (N) of inferred RS resources to be reported per report setting in a non-group-based report (in case that the CSI-ReportConfig is for inference_based_CSI_report).

numberOfSingleTRP-CSI-Model field configures the number of reported X CSIs when csi-ReportMode is set to 'Mode 1'. The field is present only if csi-ReportMode configures Mode 1.

nzp-CSI-RS-ResourcesForInterference field indicates NZP CSI RS resources for interference measurement (in case that the CSI-ReportConfig is for measurement_based_CSI_report) or for interference inference (in case that the CSI-ReportConfig is for inference_based_CSI_report). csi-ResourceConfigId of a CSI-ResourceConfig included in the configuration of the serving cell indicated with the field "carrier" above. The CSI-ResourceConfig indicated here contains only NZP-CSI-RS resources. The bwp-Id in that CSI-ResourceConfig is the same value as the bwp-Id in the CSI-ResourceConfig indicated by resources-ForChannelMeasurement.

p0alpha field indicates index of the p0-alpha set determining the power control for this CSI report transmission.

pdsch-BundleSizeForCSI field indicates PRB bundling size to assume for CQI calculation when reportQuantity is CRI/RI/i1/CQI. If the field is absent, the UE assumes that no PRB bundling is applied.

pmi-FormatIndicator field indicates whether the UE shall report a single (wideband) or multiple (subband) PMI.

pucch-CSI-ResourceList field indicates which PUCCH resource to use for reporting on PUCCH.

reportConfigType field indicates time domain behavior of reporting configuration.

reportFreqConfiguration field indicates reporting configuration in the frequency domain.

reportQuantity field indicates the CSI related quantities to report.

reportingMode field configures the UE with reporting mode for group based reporting.

reportSlotConfig field indicates periodicity and slot offset.

reportSlotOffsetList, reportSlotOffsetListDCI-0-1 and reportSlotOffsetListDCI-0-2 indicate timing offset Y for semi persistent reporting using PUSCH. This field lists the allowed offset values. This list must have the same number of entries as the pusch-TimeDomainAllocationList in PUSCH-Config. A particular value is indicated in DCI. The network indicates in the DCI field of the UL grant, which of the configured report slot offsets the UE shall apply. The DCI value 0 corresponds to the first report slot offset in this list, the DCI value 1 corresponds to the second report slot offset in this list, and so on. The first report is transmitted in slot n+Y, second report in n+Y+P, where P is the configured periodicity.

resourcesForChannelMeasurement field indicates resources for channel measurement. csi-ResourceConfigId of a CSI-ResourceConfig included in the configuration of the serving cell indicated with the field "carrier" above. The CSI-ResourceConfig indicated here contains only NZP-CSI-RS resources and/or SSB resources. This CSI-ReportConfig is associated with the DL BWP indicated by bwp-Id in that CSI-ResourceConfig.

resourcesForChannelInference field indicates resource for channel inference. csi-ResourceConfigId of a CSI-ResourceConfig included in the configuration of the serving cell indicated with the field "carrier" above. The CSI-ResourceConfig indicated here contains only NZP-CSI-RS resources and/or SSB resources. This CSI-ReportConfig is associated with the DL BWP indicated by bwp-Id in that CSI-ResourceConfig.

subbandSize field indicates one out of two possible BWP-dependent values for the subband size. If csi-ReportingBand is absent, the UE shall ignore this field.

timeRestrictionForChannelMeasurements field indicates time domain measurement restriction for the channel (signal) measurements.

timeRestrictionForInterferenceMeasurements field indicates time domain measurement restriction for interference measurements.

As an example, measurement_based_CSI_report is performed as follows.

CSI-MeasConfig for Cell A comprises a CSI-ResourceConfig (CSI-ResourceConfigId=n):
resourceType indicates periodic;
CSI-MeasConfig for Cell B comprises a CSI-ReportConfig (CSI-ReportConfigId=m):
carrier field indicates Cell A;
resourcesForChannelMeasurement field indicates n;
reportConfigType field comprises PUCCH-CSI-Resource IE for the current active uplink BWP;
UE transmits CSI report on the PUCCH-CSI-Resource of the current active uplink BWP of Cell B;
The CSI report comprises channel state information determined based on measurement on the CSI resources indicated by n.

As an example, inference_based_CSI_report is performed as follows.
CSI-MeasConfig for Cell A comprises:
a first CSI-ResourceConfig (CSI-ResourceConfigId=n and resourceTypeExt field is present); and
a second CSI-ResourceConfig (CSI-ResourceConfigId=p and resourceTypeExt field is absent);
CSI-MeasConfig for Cell B comprises a CSI-ReportConfig (CSI-ReportConfigId=m):
carrier field indicates Cell A;
resourcesForChannelMeasurement field indicates p;
resourcesForChannelInference field indicates n;
reportConfigType field comprises PUCCH-CSI-Resource IE for the current active uplink BWP;
UE transmits CSI report on the PUCCH-CSI-Resource of the current active uplink BWP of Cell B if inference_based_CSI_report is activated by a specific MAC CE or by a specific DCI;
The CSI report comprises channel state information for CSI resource indicated by n, wherein the channel state information for CSI resource is determined/inferred from measurement on the CSI resources indicated by p. UE does not measure CSI resource indicated by n.

As an example, hybrid_CSI_report is performed as follows.
CSI-MeasConfig for Cell A comprises:
a first CSI-ResourceConfig (CSI-ResourceConfigId=n and resourceTypeExt field is present); and
a second CSI-ResourceConfig (CSI-ResourceConfigId=p and resourceTypeExt field is absent);
CSI-MeasConfig for Cell B comprises a CSI-ReportConfig (CSI-ReportConfigId=m):
carrier field indicates Cell A;
resourcesForChannelMeasurement field indicates p;
resourcesForChannelInference field indicates n;
reportConfigType field comprises PUCCH-CSI-Resource IE for the current active uplink BWP;
reportBoth field is present;
UE transmits CSI report on the PUCCH-CSI-Resource of the current active uplink BWP of Cell B if inference_based_CSI_report is activated by a specific MAC CE or by a specific DCI;
The CSI report comprises:
channel state information for CSI resource indicated by n, wherein the channel state information for CSI resource is determined/inferred from measurement on the CSI resources indicated by p;
channel state information for CSI resource indicated by p;
UE does not measure CSI resource indicated by n.

For each serving cell, UE determines measurement_based_CSI_reports to be activated from one or more measurement_based_CSI-ReportConfig IEs. measurement_based_CSI-ReportConfig configures measurement_based_CSI_reporting.

UE considers a measurement_based_CSI_report of a specific measurement_based_CSI-ReportConfig IE is to be activated. The specific measurement_based_CSI-ReportConfig IE is measurement_based_CSI-ReportConfig IE of which reportConfigType field comprises a field for 'periodic'. measurement_based_CSI-ReportConfig IE of which reportConfigType field comprises a field for 'aperiodic' or a field for 'semi-persistent' are considered to be deactivated. They are activated based on a specific MAC CE or a specific DCI.

For each serving cell, UE determines applicable inference_based_CSI_reports from one or more inference_based_CSI-ReportConfig IEs (applicable TIPs for BM1).

UE considers an inference_based_CSI_report is applicable in case that:

the corresponding CSI-ReportConfig IE comprises the associatedId field that matches with that of AIML model for the concerned functionality that is available in the UE;

the CSI-ResourceConfig of resourceForChannelInference and the CSI-ResourceConfig of resourceForChannelMeasurement are aligned with training profile of the AIML model for the concerned functionality.

GNB may configure UE to update the applicable TIPs by including relevant parameters in otherConfig IE in the RRCReconfiguration message.

UE consider itself to be configured to provide updated applicable TIPs in case that received otherConfig includes applicableCSIreportConfig.

OtherConfig-v1900::=SEQUENCE {
applicableCSIreportConfig     SetupRelease
    {ApplicableCSIreportConfig}OPTIONAL, --Need M
}
. . . .
ApplicableCSIreportConfig::=SEQUENCE {
applicableCSIreportProhibitTimer ENUMERATED {s0,
    s0dot5, s1, s2, s5, s10, s20, s30,
    s60, s90, s120, s300, s600, spare3, spare2, spare1}
}
///Indicates the prohibit timer for reporting updated applicable CSI report configuration (or applicable TIPs). Value in seconds. Value s0 means prohibit timer is set to 0 seconds, value s0dot5 means prohibit timer is set to 0.5 seconds, value s1 means prohibit timer is set to 1 second and so on.///

If the RRCReconfiguration message comprises applicableCSIreportConfig, UE reports the applicable TIPs in the corresponding RRCReconfigurationComplete message and the updated applicable TIPs in UEAssistanceInformation.

At 3A41, UE performs applicable TIP reporting based on RRCReconfigurationComplete message or UEAssistanceInformation message.

If RRCReconfiguration comprises applicableCSIreportConfig (or UE is configured to report applicable TIP), UE performs an initial reporting and subsequent reportings and duplicate reporting.

The initial reporting is performed via RRCReconfigurationComplete message that are transmitted in response to the RRCReconfiguration message that comprises applicableCSIreportConfig.

The subsequent reporting is performed via UEAssistanceInformation message.

The duplicate reporting is performed via retransmission of UEAssistanceInformation message after successful completion of synchronous reconfiguration (e.g. reconfiguration with sync). UE performs retransmission of UEAssistanceInformation message upon successful completion of synchronous reconfiguration in case that:

the UE initiated transmission of UEAssistanceInformation message during the last 1 second The prohibit timer is utilized to prevent frequent reporting. Since the initial reporting is time-critical (GNB needs to know the applicable TIPs as soon as possible), the prohibit timer starts after transmission of RRCReconfigurationComplete message is initiated. In case of subsequent reporting, the prohibit timer starts before transmission of UEAssistanceInformation message is initiated.

RRCReconfigurationComplete-v1900-IEs::=SEQUENCE {
applicableCSIreportList ApplicableCSIreportList OPTIONAL,
}
ApplicableCSIreportList::=SEQUENCE (SIZE (1 . . . max)) OF ApplicableCSIReport
ApplicableCSIReport::=SEQUENCE {
servCellIndex ServCellIndex,
    aimlModelId AimlModelId,
associatedId AssociatedId
shortAssociatedId ShortAssociatedId
}

With regards to applicable TIPs, UE performs first set of actions in case that:

the RRCReconfiguration message comprises applicableCSIreportConfig; and

At least one applicable inference_based_CSI_report configuration is available.

UE performs the first set of actions in the order. The first set of action comprises:

setting the ApplicableCSIreportList based on the applicable inference_based_CSI_report configurations;

initiating relevant procedures for transmission of RRCReconfigurationComplete message (e.g. putting the RRCReconfigurationComplete message in the transmission buffer of MAC entity and initiating SR procedure); and starting a prohibit timer with the timer value set to applicableCSIreportProhibitTimer.

UE performs second set of actions in case that:

the RRCReconfiguration message comprises applicableCSIreportConfig (e.g. UE is configured to report applicable TIPs);

At least one applicable inference_based_CSI_report configuration changes comparing to latest/last reported ones; and

The prohibit timer is not running.

UE performs the second set of actions in the order. The first set of action comprises:

starting the prohibit timer with the timer value set to applicableCSIreportProhibitTimer.

setting the ApplicableCSIreportList based on the current applicable inference_based_CSI_report configurations;

initiating relevant procedures for transmission of UEAssistanceInformation message (e.g. putting the message in the transmission buffer of MAC entity).

UEAssistanceInformation-v1900-IEs::=SEQUENCE {
applicableCSIreportList ApplicableCSIreportList OPTIONAL,
}

ApplicableCSIreportList::=SEQUENCE (SIZE (1 . . . max)) OF ApplicableCSIReport

ApplicableCSIReport::=SEQUENCE {
servCellIndex ServCellIndex,
aimlModelId AimlModelId,
associatedId AssociatedId
shortAssociatedId ShortAssociatedId
}

RRC-TransactionIdentifier in the RRCReconfiguration message and RRC-TransactionIdentifier in the RRCReconfigurationComplete message are same.

UEAssistanceInformation message does not comprise RRC-TransactionIdentifier.

Based on the information, GNB may determine to activate one or more AIML models to enable inference_based_CSI_reporting.

At 3A50, GNB activates one or more AIML models for BM1. An AIML model is identified by a CSI report configuration. Activation of the AIML model can be achieved by activating the corresponding CSI report configuration. In addition, GNB may need to inform UE which A-ID is applied with the CSI report configuration.

Activation of measurement_based_CSI_reporting is performed in a single step. GNB transmits a signal to inform the UE to activate the corresponding CSI reporting for measurement_based_CSI_reporting.

TABLE 1

| | CSI reporting configuration | | |
|---|---|---|---|
| CSI-RS Con-figuration | Periodic measurement_based_CSI Reporting | Semi-Persistent measurement_based_CSI Reporting | Aperiodic measurement_based_CSI Reporting |
| Periodic CSI-RS | No dynamic triggering/ activation (i.e. CSI reporting is activated upon configuration) | For reporting on PUCCH, SP CSI reporting on PUCCH Activation/ Deactivation MAC CE is received; for reporting on PUSCH, the UE receives triggering on DCI in DCI format 0_1 or in DCI format 0_2. The DCI is addressed by SP CSI-RNTI. UE activates/ performs SP CSI reporting on PUCCH in the serving cell indicated by the MAC CE. UE activates/ performs SP CSI reporting on PUCCH in the serving cell where the DCI is received (or PUSCH transmission is performed). | The UE receives triggering on DCI in DCI format 0_1 or in DCI format 0_2. The DCI comprises 'CSI request' field. The DCI is addressed by C-RNTI. UE performs AP CSI reporting on PUSCH in the serving cell where the DCI is received (or PUSCH transmission is performed). |
| Semi-Persistent CSI-RS | Not Supported | Same as above | Same as above |
| Aperiodic CSI-RS | Not Supported | Not Supported | Same as above |

Activation of AIML model for BM1 (activation of inference_based_CSI_reporting) is performed in two steps. GNB first informs UE A-ID of the CSI report configuration to be activated for BM1. GNB then transmits the signal to inform the UE to activate the corresponding CSI reporting for inference_based_CSI_reporting.

The first step may be skipped if only one A-ID is available/configured for the CSI report. To perform the first step, GNB may transmit a specific MAC CE (denoted as A-ID MAC CE). The A-ID MAC CE comprises one or more sets of fields. Each set of fields comprises Serving Cell index, CSI-ReportConfigId and A-ID. The UE determines the A-ID to be applied based on the associated CSI-ReportConfigId and Serving Cell Index.

The second step is performed as below.

TABLE 2

| | CSI reporting configuration | | |
|---|---|---|---|
| CSI-RS Con-figuration | Periodic inference_based_CSI Reporting for BM1 | Semi-Persistent inference_based_CSI Reporting for BM1 | Aperiodic inference_based_CSI Reporting for BM1 |
| Periodic CSI-RS | When A-ID is informed for the CSI reporting (P-CSI reporting is configured when CSI-ReportConfig is received, and activated when corresponding A-ID MAC CE is received) | For reporting on PUCCH, SP CSI reporting on PUCCH Activation/ Deactivation MAC CE is received; for reporting on PUSCH, the UE receives triggering on DCI in DCI format 0_1 or in DCI format 0_2. The DCI is addressed by SP CSI-RNTI. UE activates/ performs SP CSI reporting on PUCCH in the serving cell indicated by the MAC CE. UE activates/ performs SP CSI reporting on PUCCH in the serving cell where the DCI is received (or PUSCH transmission is performed). | The UE receives triggering on DCI in DCI format 0_1 or in DCI format 0_2. The DCI comprises 'CSI request' field. The DCI is addressed by C-RNTI. UE performs AP CSI reporting on PUSCH in the serving cell where the DCI is received (or PUSCH transmission is performed). |
| Semi-Persistent CSI-RS | Not Supported | Same as above | Same as above |
| Aperiodic CSI-RS | Not Supported | Not Supported | Same as above |

Alternatively, a single MAC CE/DCI indicates both A-ID and CSI-ReportConfigId.

Instead of full A-ID, a short A-ID can be indicated in the DCI. The mapping between the full A-ID and the short A-ID can be explicitly indicated in the RRCReconfiguration message. Alternatively, the mapping can be done based on a predefined rule (e.g. the last n bit of full A-ID is corresponding short A-ID; the part that are assigned by the base station is short A-ID etc).

One step activation of inference_based_CSI reporting is performed as below.

TABLE 3

| | | CSI reporting configuration | | |
|---|---|---|---|---|
| CSI-RS Con-figuration | Periodic inference_based_CSI Reporting for BM1 | Semi-Persistent inference_based_CSI Reporting for BM1 | Aperiodic inference_based_CSI Reporting for BM1 | |
| Periodic CSI-RS | Not supported | For reporting on PUCCH, SP AI CSI reporting on PUCCH Activation/ Deactivation MAC CE is received; for reporting on PUSCH, the UE receives triggering on DCI in DCI format 0_1 or in DCI format 0_2. The DCI is addressed by SP CSI-RNTI. The DCI comprises short A-ID field. UE activates/ performs SP CSI reporting on PUCCH in the serving cell indicated by the MAC CE. UE activates/ performs SP CSI reporting on PUCCH in the serving cell where the DCI is received(or PUSCH transmission is performed). | The UE receives triggering on DCI in DCI format 0_1 or in DCI format 0_2. The DCI comprises 'CSI request' field. The DIC comprsies short A-ID field. The DCI is addressed by C-RNTI. UE performs AP CSI reporting on PUSCH in the serving cell where the DCI is received (or PUSCH transmission is performed). | 5 10 15 20 25 30 |
| Semi-Persistent CSI-RS | Not Supported | Same as above. | Same as above | 35 |
| Aperiodic CSI-RS | Not Supported | Not Supported | Same as above | |

A-ID MAC CE is denoted as first MAC CE.

SP AI CSI reporting on PUCCH Activation/Deactivation MAC CE is denoted as second MAC CE.

SP CSI reporting on PUCCH Activation/Deactivation MAC CE is denoted as third MAC CE.

<A-ID MAC CE>

The A-ID MAC CE (denoted as first MAC CE) (3B10) is identified by a MAC subheader with LCID. It has a variable size with following fields:

> #Serving Cell ID: This field indicates the identity of the Serving Cell for which the following fields (short AID/BWP ID) applies. The length of the field is 5 bits;
> #BWP ID: This field indicates a UL BWP for which the following field (short AID) applies as the codepoint of the DCI bandwidth part indicator field. The length of the BWP ID field is 2 bits;
> #E: This field indicates whether another set of fields (Serving Cell ID, BWP ID, Short A-ID, E) follows after Short A-ID field;
> #Short Associated ID: This field indicates the short A-ID of the SP AI CSI report configuration (e.g. activated inference_based_CSI_report configuration) to be activated for the BWP of the serving cell.

<SP AI CSI Reporting on PUCCH Activation/Deactivation MAC CE>

The SP AI CSI reporting on PUCCH Activation/Deactivation MAC CE (denoted as second MAC CE) (3B20) is identified by a MAC subheader with LCID. It has a variable size with following fields:

> #Serving Cell ID: This field indicates the identity of the Serving Cell for which the MAC CE applies. The length of the field is 5 bits;
> #BWP ID: This field indicates a UL BWP for which the MAC CE applies as the codepoint of the DCI bandwidth part indicator field. The length of the BWP ID field is 2 bits;
> #L: This field indicates whether the MAC CE applies to SP CSI reporting on PUCCH Activation/Deactivation for LTM or not. If ltm-CSI-ReportConfigToAddMod-List is not configured, R field is present instead (i.e. set to 0);
> #$S_i$: This field indicates the activation/deactivation status of the Semi-Persistent CSI report configuration within ltm-CSI-ReportConfigToAddModList if L field is set to 1, or csi-ReportConfigToAddModList if L field is set to 0. $S_0$ refers to the report configuration which includes PUCCH resources for SP CSI reporting in the indicated BWP and has the lowest CSI-ReportConfigId or LTM-CSI-ReportConfigId within the list with type set to semiPersistentOnPUCCH, $S_1$ to the report configuration which includes PUCCH resources for SP CSI reporting in the indicated BWP and has the second lowest CSI-ReportConfigId or LTM-CSI-ReportConfigId and so on. If the number of report configurations within the list with type set to semiPersistentOn-PUCCH in the indicated BWP is less than i+1, MAC entity shall ignore the $S_i$ field. The $S_i$ field is set to 1 to indicate that the corresponding Semi-Persistent CSI report configuration shall be activated. The $S_i$ field is set to 0 to indicate that the corresponding Semi-Persistent CSI report configuration i shall be deactivated. If the Semi-Persistent CSI report configuration i is configured with csi-ReportSubConfigToAddModList, the $S_i$ field is set to 0 to additionally indicate that all sub-configurations within csi-ReportSubConfigToAddModList shall be deactivated;
> #R: Reserved bit, set to 0;
> #Short Associated ID: This field indicates the short A-ID of the activated SP AI CSI report configuration (e.g. activated inference_based_CSI_report configuration).
>> ##The field in the third octet corresponds to a CSI-ReportConfig that is associated with the lowest CSI-ReportConfigId or LTM-CSI-ReportConfigId among CSI-ReportConfigs that is:
>>> ###within the list with type set to semiPersistentOn-PUCCH; and
>>> ###inference_based_CSI_report (e.g. configured with associatedId);
>> ##The field in the fourth octet corresponds to a CSI-ReportConfig that is associated with the second lowest CSI-ReportConfigId or LTM-CSI-ReportConfigId among CSI-ReportConfigs that is:
>>> ###within the list with type set to semiPersistentOn-PUCCH; and
>>> ###inference_based_CSI_report (e.g. configured with associatedId);

At 3A60, UE performs BM1 AIML model inference operation for a specific BWP of a specific serving cell. UE performs spatial-domain Downlink beam prediction for Set A of beams based on measurement results of Set B of beams. Set A is determined based on resourcesForChannelInference and Set B is determined based on resourcesForChannelMeasurement.

UE takes the measurement results of Set B as input to AIML model associated with the A-ID.

UE determines channel state information to be reported for Set B based on output of AIML model associated with the A-ID.

For semi-persistent inference_based_CSI reporting on PUCCH, UE determines:

the specific serving cell based on the Serving Cell ID field in the third MAC CE (in case of two step activation) or in the second MAC CE (in case of one step activation);

the specific BWP based on BWP ID field in the third MAC CE (in case of two step activation) or in the second MAC CE (in case of one step activation);

the AIML model based on short A-ID field field in the first MAC CE (in case of two step activation) or in the second MAC CE (in case of one step activation);

the AIML model and the Set A and the Set B are determined based on Si field in the third MAC CE (in case of two step activation) or in the second MAC CE (in case of one step activation);

For semi-persistent inference_based_CSI reporting on PUSCH or for aperiodic inference_based_CSI reporting on PUSCH, UE determines:

the specific serving cell based on which serving cell the DCI is received (in case of self-scheduling) or on which serving cell PUSCH transmission is scheduled (in case of cross-carrier scheduling; scheduling serving cell is determined based on schedulingCellId field of Cross-CarrierSchedulingConfig IE of scheduled cell; the specific serving cell is scheduled cell);

the specific BWP based on BWP ID field in the DCI;

the AIML model based on short A-ID field in the DCI (in case of one step activation) or in the first MAC CE (in case of two step activation);

the AIML model and the Set A and the Set B are determined based on CSI request field in the DCI.

At 3A70, UE performs CSI reporting on PUCCH (or PUSCH). The CSI report comprises channel state information of Set A. The CSI report comprises channel state information of Set B in case that the CSI-ReportConfig comprises reportBoth field.

At 3A80, UE stops AIML model inference operation (UE deactivates AIML model) at a specific time point in case that:

DCI that results in BWP switching is received, wherein the specific time point is determined based on active BWP switch delay;

a specific timer expires that results in BWP switching, wherein the specific time point is determined based on active BWP switch delay;

random access is triggered that results in BWP switching, wherein the specific time point is determined based on active BWP switch delay;

RRCReconfiguration that triggers synchronous reconfiguration (reconfiguration with sync), wherein the specific time point is determined based on MAC reset (AIML model inference operation stops when MAC reset occurs);

MAC reset occurs, wherein the specific time point is when MAC reset occurs.

At 3A90, UE resume/reactivate AIML model inference operation at a second specific time point in case that:

active BWP switch occurs and AIML model is already activated in the new BWP (based on the first MAC CE or the second MAC CE), wherein the second specific time point is determined based on active BWP switch delay;

reconfiguration with sync occurred and the MIB of the target SpCell is acquired (or SFN of the target SpCell is determined/acquired) wherein the second specific time point is when SFN of the target SpCell is determined/acquired.

At some point of time, GNB determines to handover the UE to another cell. GNB transmits UE a second RRCReconfiguration message that comprises ReconfigurationWithSync IE.

UE consider itself still configured to report applicable TIPs in the target cell in case that:

applicableCSIreportConfig is not comprised in the second RRCReconfiguration message; and fullConfig is not configured (fullConfig is not comprised in the second RRCReconfiguration message).

UE consider itself still not configured to report applicable TIPs in the target cell in case that:

applicableCSIreportConfig (that is set to release) is comprised in the second RRCReconfiguration message; or fullConfig is configured (fullConfig is comprised in the RRCReconfiguration message) and applicableCSIreportConfig is not comprised in the second RRCReconfiguration message.

UE performs handover procedure based on the Cell-GroupConfig and ReconfigurationWithSync. UE performs random access procedure in the target cell. UE receives MIB in the target cell. UE acquires SFN of the target cell based on the received MIB. UE transmits a second RRCReconfigurationComplete message in the target cell. When random access procedure is successfully completed, UE consider handover is successfully completed.

UE includes the applicableCSIreportList in the second RRCReconfigurationComplete message in case that:

UE is still configured to report applicable TIPs in the target cell; and applicable TIPs reported in the source cell (before handover) is not same as currently applicable TIPs.

UE does not include the applicableCSIreportList in the second RRCReconfigurationComplete message otherwise.

UE starts the prohibit timer after transmission of the second RRCReconfigurationComplete message.

UE determines to transmit applicableCSIreportList in UEAssistanceInformation in case that:

the prohibit timer is not running (or stopped and not restarted); and current applicableCSIreportList is not equal to the last reported one.

UE determines to transmit applicableCSIreportList in RRCReconfigurationComplete in case that:

the prohibit timer is running or not running (stopped and not restarted); and current applicableCSIreportList is not equal to the last reported one.

RRC-TransactionIdentifier in the RRCReconfiguration message (that comprised applicableCSIreportConfig; that provided configuration for reporting of applicable TIPs) and RRC-TransactionIdentifier in the second RRCReconfigurationComplete message (that comprise information on applicable TIPs and that are transmitted after synchronous reconfiguration is initiated) are different.

RRC-TransactionIdentifier in the RRCReconfiguration message (that comprised applicableCSIreportConfig; that provided configuration for reporting of applicable TIPs) and RRC-TransactionIdentifier in the first RRCReconfigurationComplete message (that comprise information on applicable TIPs and that are transmitted before synchronous reconfiguration is initiated/completed) are same.

RRC-TransactionIdentifier in the first RRCReconfigurationComplete message and RRC-TransactionIdentifier in the second RRCReconfigurationComplete message are different.

<CSI-RS>

CSI-RS (Channel State Information Reference Signal) is a component in 5G NR networks for channel estimation and measurement. The configuration of CSI-RS resources is flexible and can be tailored to specific network requirements.

Time Domain Configuration

CSI-RS resources can be configured in various ways within the time domain:

Symbol Allocation: A CSI-RS resource may occupy 1, 2, or 4 OFDM symbols, depending on the configured number of ports.

Symbol Positions: CSI-RS can start at any OFDM symbol within a slot. For Tracking Reference Signal (TRS) purposes, specific symbol positions like {4,8}, {5,9}, and {6,10} are supported.

Periodicity: CSI-RS can be periodic, semi-persistent, or aperiodic (triggered by Downlink Control Information).

Frequency Domain Configuration

The frequency domain allocation of CSI-RS is highly configurable:

Resource Blocks: CSI-RS can be allocated to a specific set of Resource Blocks (RBs) within the carrier bandwidth[1].

RB Offset: The starting RB for CSI-RS transmission can be specified (0 to 268, in steps of 4)[2].

Density: This parameter quantifies the number of Resource Elements (REs) allocated to CSI-RS per RB per port (0.5, 1, or 3).

Port Configuration

CSI-RS supports various port configurations:

Number of Ports: A CSI-RS resource can correspond to 1 to 32 different antenna ports.

CDM Type: When multiple ports share the same RE allocation, Code Division Multiplexing (CDM) is used. Options include FD-CDM2, CDM4-FD2-TD2, etc.

Power Control

CSI-RS power can be controlled relative to other signals:

Power Control Offset: Specifies the transmit power difference between CSI-RS and PDSCH (−8 to 15 dB)[1].

Power Control Offset SS: Defines the power difference between CSI-RS and SSS (−3, 0, 3, 6 dB)[1].

CSI-RS Types

There are three main types of CSI-RS:

Non-Zero Power (NZP) CSI-RS: Used for channel measurement and estimation.

Zero Power (ZP) CSI-RS: Informs UEs about REs not mapped to data, increasing available REs.

CSI Interference Measurement (CSI-IM): Used for interference measurement.

Configuration Considerations

When configuring CSI-RS resources, the base station consider the following:

Bandwidth Allocation: While it's possible to allocate CSI-RS to a subset of the total bandwidth, using all available PRBs provides more comprehensive channel information.

Purpose-Specific Configuration: Different CSI-RS configurations may be used for various purposes. For example, CSI-RS for PMI (Precoding Matrix Indicator) reports typically use a minimum of 4 ports, while single-port configurations may be used for other purposes.

UE Capability: The configuration should align with UE capabilities, which are reported to the network.

The IE NZP-CSI-RS-ResourceSet is a set of Non-Zero-Power (NZP) CSI-RS resources (their IDs) and set-specific parameters.

NZP-CSI-RS-ResourceSet::=SEQUENCE {
nzp-CSI-ResourceSetId NZP-CSI-RS-ResourceSetId,
nzp-CSI-RS-Resources SEQUENCE (SIZE (1 . . . maxN-rofNZP-CSI-RS-ResourcesPerSet)) OF NZP-CSI-RS-ResourceId,
repetition ENUMERATED {on, off}OPTIONAL, --Need S

. . . .

<TCI State>

The Transmission Configuration Indication (TCI) state plays a role in defining how data is transmitted and received between the User Equipment (UE) and the base station.

Definition and Purpose

TCI states are a set of parameters that define the transmission configuration for downlink (DL) and uplink (UL) signals. These parameters are essential for the UE to correctly decode and process the received signals.

TCI State Indication

TCI states are dynamically indicated to the UE through Downlink Control Information (DCI) messages. These messages include configurations such as Quasi Co-Location (QCL) information, which helps the UE to assume similar radio channel properties for different signals.

QCL and TCI States

QCL is closely related to TCI states. QCL indicates that certain signals (e.g., PDSCH, CORESET, PDCCH) have similar radio channel properties, allowing the UE to use the same channel estimation for these signals. The TCI state for PDSCH, for example, can be the same as the TCI state for CORESET/PDCCH, simplifying the UE's processing.

Activation and Deactivation

TCI states can be activated or deactivated through specific control elements in the DCI messages. For instance, up to two TCI states can be activated per TCI codepoint of the DCI, one for DL signals/channels and one for UL signals/channels, in the case of "Separate DL/UL TCI".

TCI State Information

The TCI state information is critical for various operations, such as direct Secondary Cell (SCell) activation. The network requires the TCI state information to ensure proper configuration and to avoid conflicts or misconfigurations.

UE Reporting

The UE's knowledge of the TCI state is considered "known" if it has reported a Layer 1 Reference Signal Received Power (L1-RSRP) or Layer 3 RSRP measurement to the network within a specified time. This ensures that the UE and the network are synchronized regarding the transmission configuration.

Configuration

<Measurements>

In RRC_CONNECTED, the UE measures multiple beams (at least one) of a cell and the measurements results (power values) are averaged to derive the cell quality. In doing so, the UE is configured to consider a subset of the detected beams. Filtering takes place at two different levels: at the physical layer to derive beam quality and then at RRC level to derive cell quality from multiple beams. Cell quality from beam measurements is derived in the same way for the serving cell(s) and for the non-serving cell(s). Measurement reports may contain the measurement results of the X best beams if the UE is configured to do so by the gNB.

The corresponding high-level measurement model is described in FIG. XX:

A: measurements (beam specific samples) internal to the physical layer.

Layer 1 filtering: internal layer 1 filtering of the inputs measured at point A. Exact filtering is implementation dependent. How the measurements are actually executed in the physical layer by an implementation (inputs A and Layer 1 filtering) is not constrained by the standard.

$A^1$: measurements (i.e. beam specific measurements) reported by layer 1 to layer 3 after layer 1 filtering.

Beam Consolidation/Selection: beam specific measurements are consolidated to derive cell quality. The behaviour of the Beam consolidation/selection is standardised and the configuration of this module is provided by RRC signalling. Reporting period at B equals one measurement period at $A^1$.

B: a measurement (i.e. cell quality) derived from beam-specific measurements reported to layer 3 after beam consolidation/selection.

Layer 3 filtering for cell quality: filtering performed on the measurements provided at point B. The behaviour of the Layer 3 filters is standardised and the configuration of the layer 3 filters is provided by RRC signalling. Filtering reporting period at C equals one measurement period at B.

C: a measurement after processing in the layer 3 filter. The reporting rate is identical to the reporting rate at point B. This measurement is used as input for one or more evaluation of reporting criteria.

Evaluation of reporting criteria: checks whether actual measurement reporting is necessary at point D. The evaluation can be based on more than one flow of measurements at reference point C e.g. to compare between different measurements. This is illustrated by input C and $C^1$. The UE shall evaluate the reporting criteria at least every time a new measurement result is reported at point C, $C^1$. The reporting criteria are standardised and the configuration is provided by RRC signalling (UE measurements).

D: measurement report information (message) sent on the radio interface.

L3 Beam filtering: filtering performed on the measurements (i.e. beam specific measurements) provided at point $A^1$. The behaviour of the beam filters is standardised and the configuration of the beam filters is provided by RRC signalling. Filtering reporting period at E equals one measurement period at $A^1$.

E: a measurement (i.e. beam-specific measurement) after processing in the beam filter. The reporting rate is identical to the reporting rate at point $A^1$. This measurement is used as input for selecting the X measurements to be reported.

Beam Selection for beam reporting: selects the X measurements from the measurements provided at point E. The behaviour of the beam selection is standardised and the configuration of this module is provided by RRC signalling.

F: beam measurement information included in measurement report (sent) on the radio interface.

Layer 1 filtering introduces a certain level of measurement averaging. How and when the UE exactly performs the required measurements is implementation specific to the point that the output at B fulfils the performance requirements set in TS 38.133. Layer 3 filtering for cell quality and related parameters used are specified in TS 38.331. L3 Beam filtering and related parameters used are specified in TS 38.331.

SS reference signal received power (SS-RSRP) is defined as the linear average over the power contributions (in [W]) of the resource elements that carry secondary synchronization signals. The measurement time resource(s) for SS-RSRP are confined within SS/PBCH Block Measurement Time Configuration (SMTC) window duration. If SS-RSRP is used for L1-RSRP as configured by reporting configurations, the measurement time resources(s) restriction by SMTC window duration is not applicable.

For SS-RSRP determination demodulation reference signals for physical broadcast channel (PBCH) and, if indicated by higher layers, CSI reference signals in addition to secondary synchronization signals may be used. SS-RSRP using demodulation reference signal for PBCH or CSI reference signal shall be measured by linear averaging over the power contributions of the resource elements that carry corresponding reference signals taking into account power scaling for the reference signals as defined in TS 38.213. If SS-RSRP is not used for L1-RSRP, the additional use of CSI reference signals for SS-RSRP determination is not applicable. SS-RSRP shall be measured only among the reference signals corresponding to SS/PBCH blocks with the same SS/PBCH block index and the same physical-layer cell identity. If SS-RSRP is not used for L1-RSRP and higher-layers indicate certain SS/PBCH blocks for performing SS-RSRP measurements, then SS-RSRP is measured only from the indicated set of SS/PBCH block(s).

CSI reference signal received power (CSI-RSRP), is defined as the linear average over the power contributions (in [W]) of the resource elements of the antenna port(s) that carry CSI reference signals configured for RSRP measurements within the considered measurement frequency bandwidth in the configured CSI-RS occasions. For CSI-RSRP determination CSI reference signals transmitted on antenna port 3000 according to TS 38.211 shall be used. If CSI-RSRP is used for L1-RSRP, CSI reference signals transmitted on antenna ports 3000, 3001 can be used for CSI-RSRP determination. For intra-frequency CSI-RSRP measurements, if the measurement gap is not configured, UE is not expected to measure the CSI-RS resource(s) outside of the active downlink bandwidth part.

The measurement configuration includes the following parameters:

Measurement objects: A list of objects on which the UE shall perform the measurements.

For intra-frequency and inter-frequency measurements a measurement object indicates the frequency/time location and subcarrier spacing of reference signals to be measured. Associated with this measurement object, the network may configure a list of cell specific offsets, a list of 'exclude-listed' cells and a list of 'allow-listed' cells. Exclude-listed cells are not applicable in event evaluation or measurement reporting. Allow-listed cells are the only ones applicable in event evaluation or measurement reporting.

The measObjectId of the MO which corresponds to each serving cell is indicated by servingCellMO within the serving cell configuration.

Reporting configurations: A list of reporting configurations where there can be one or multiple reporting configurations per measurement object. Each measurement reporting configuration consists of the following:

Reporting criterion: The criterion that triggers the UE to send a measurement report. This can either be periodical or a single event description.

RS type: The RS that the UE uses for beam and cell measurement results (SS/PBCH block or CSI-RS).

Reporting format: The quantities per cell and per beam that the UE includes in the measurement report (e.g. RSRP) and other associated information such as the maximum number of cells and the maximum number beams per cell to report.

Measurement identities: For measurement reporting, a list of measurement identities where each measurement identity links one measurement object with one reporting configuration. By configuring multiple measurement identities, it is possible to link more than one measurement object to the same reporting configuration, as well as to link more than one reporting configuration to the same measurement object. The measurement identity is also included in the measurement report that triggered the reporting, serving as a reference to the network. For conditional reconfiguration triggering, one measurement identity links to exactly one conditional reconfiguration trigger configuration. And up to 2 measurement identities can be linked to one conditional reconfiguration execution condition.

Quantity configurations: The quantity configuration defines the measurement filtering configuration used for all event evaluation and related reporting, and for periodical reporting of that measurement. For NR measurements, the network may configure up to 2 quantity configurations with a reference in the NR measurement object to the configuration that is to be used. In each configuration, different filter coefficients can be configured for different measurement quantities, for different RS types, and for measurements per cell and per beam.

<Layer 3 Filtering>

The UE shall:

for each cell measurement quantity and for each beam measurement quantity:

filter the measured result, before using for evaluation of reporting criteria, for measurement reporting, for U2N/U2U Relay (re)selection evaluation or for evaluating the SyncRef UE, by the following formula:

$$Fn=(1-a)*Fn-1+a*Mn$$

where

Mn is the latest received measurement result from the physical layer;

Fn is the updated filtered measurement result, that is used for evaluation of reporting criteria (e.g. logging condition evaluation);

Fn−1 is the old filtered measurement result, where F0 is set to M1 when the first measurement result from the physical layer is received; and for MeasObjectNR, $a=\frac{1}{2}^{\wedge}(ki/4)$, where ki is the filterCoefficient for the corresponding measurement quantity of the i:th QuantityConfigNR in quantityConfigNR-List, and i is indicated by quantityConfigIndex in MeasObjectNR; for other measurements, $a=\frac{1}{2}^{\wedge}(k/4)$, where k is the filterCoefficient for the corresponding measurement quantity received by the quantityConfig;

adapt the filter such that the time characteristics of the filter are preserved at different input rates, observing that the filterCoefficient k assumes a sample rate equal to X ms; The value of X is equivalent to one intra-frequency L1 measurement period assuming non-DRX operation, and depends on frequency range.

<Derivation of Cell Measurement Results>

Cell measurement result and cell-level measurement result are used interchangeably.

The network may configure the UE in RRC_CONNECTED to derive RSRP, RSRQ and SINR measurement results per cell associated to NR measurement objects based on parameters configured in the measObject (e.g. maximum number of beams to be averaged and beam consolidation thresholds) and in the reportConfig (rsType to be measured, SS/PBCH block or CSI-RS). For The UE shall:

for each cell measurement quantity to be derived based on SS/PBCH block:

if nrofSS-BlocksToAverage is not configured in the associated measObject in RRC_CONNECTED; or if absThreshSS-BlocksConsolidation is not configured in the associated measObject in RRC_CONNECTED; or if the highest beam measurement quantity value is below or equal to absThreshSS-BlocksConsolidation:

derive each cell measurement quantity based on SS/PBCH block as the highest beam measurement quantity value, where each beam measurement quantity is described in TS 38.215;

else:

derive each cell measurement quantity based on SS/PBCH block as the linear power scale average of the highest beam measurement quantity values above absThreshSS-BlocksConsolidation where the total number of averaged beams shall not exceed nrofSS-BlocksToAverage;

if in RRC_CONNECTED, apply layer 3 cell filtering;

for each cell measurement quantity to be derived based on CSI-RS:

consider a CSI-RS resource to be applicable for deriving cell measurements when the concerned CSI-RS resource is included in the csi-rs-CellMobility including the physCellId of the cell in the CSI-RS-ResourceConfigMobility in the associated measObject;

if nrofCSI-RS-ResourcesToAverage in the associated measObject is not configured; or if absThreshCSI-RS-Consolidation in the associated measObject is not configured; or if the highest beam measurement quantity value is below or equal to absThreshCSI-RS-Consolidation:

derive each cell measurement quantity based on applicable CSI-RS resources for the cell as the highest beam measurement quantity value;

else:

derive each cell measurement quantity based on CSI-RS as the linear power scale average of the highest beam measurement quantity values above absThreshCSI-RS-Consolidation where the total number of averaged beams shall not exceed nrofCSI-RS-ResourcesToAverage;

apply layer 3 cell filtering.

The IE MeasObjectNR specifies information applicable for SS/PBCH block(s) intra/inter-frequency measurements and/or CSI-RS intra/inter-frequency measurements.

nrofSS-BlocksToAverage INTEGER (2 . . . maxNrofSS-BlocksToAverage)

Number of SS blocks to average for cell measurement derivation.

absThreshSS-BlocksConsolidation ThresholdNR

Threshold for consolidation of L1 measurements per RS index.

nrofCSI-RS-ResourcesToAverage INTEGER (2 . . . maxNrofCSI-RS-ResourcesToAverage)

Indicates the maximum number of measurement results per beam based on CSI-RS resources to be averaged. The same value applies for each detected cell associated with this MeasObjectNR.

absThreshCSI-RS-Consolidation ThresholdNR

Absolute threshold for the consolidation of measurement results per CSI-RS resource(s) from L1 filter(s). The field is used for the derivation of cell measurement results and the reporting of beam measurement information per CSI-RS resource.

Each serving cell may be configured with a serving-CellMO. It is measObjectId of the MeasObjectNR in MeasConfig which is associated to the serving cell.

Figure 4:
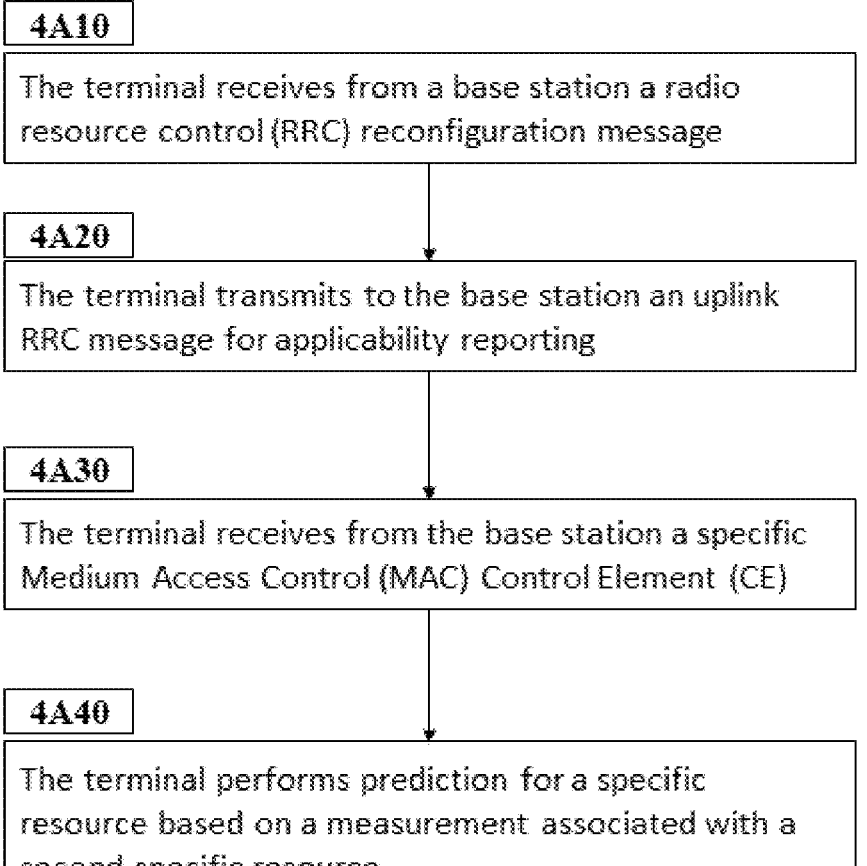
FIG. 4 is a flow diagram illustrating operations of a terminal.

FIG. 4 is a flow diagram illustrating an operation of a terminal.

At 4A10, terminal receives from a base station a radio resource control (RRC) reconfiguration message, wherein the RRC reconfiguration message comprises:

>: one or more sets of configuration parameters for Channel Status Information (CSI) report; and >: an applicability report configuration parameter;

At 4A20, terminal transmits to the base station an uplink RRC message for applicability reporting; and At 4A30, terminal receives from the base station a specific Medium Access Control (MAC) Control Element (CE);

At 4A40, terminal performs prediction for a first specific resource based on a measurement associated with a second specific resource. Terminal activates a specific AIML functionality.

The specific resource is determined based on a first resource configuration identifier [resourcesForChannelInference] in a specific set of configuration parameters for CSI report.

The second specific resource is determined based on a second resource configuration identifier [resourcesForChannelMeasurement] in the specific set of configuration parameters for CSI report.

The terminal performs measurement on the second specific resource.

The terminal does not perform measurement on the specific resource.

The specific set of configuration parameters for CSI report is determined based on a specific field in the specific MAC CE.

The uplink RRC message comprises one or more applicability reports.

Each of the one or more applicability reports comprises:

>: a serving cell index indicating index of the serving cell that the applicability report refers to; and >: at least one identifier associated with CSI report.

The uplink RRC message is either a RRC reconfiguration complete message or a User Equipment (UE) assistance Information message.

In case that the uplink RRC message is the RRC reconfiguration complete message, the uplink RRC message further comprises a specific identifier, wherein the specific identifier together with a message type identifies corresponding RRC procedure.

In case that the uplink RRC message is the UE assistance information, the uplink RRC message does not comprise the specific identifier.

The specific set of configuration parameters for CSI report is associated with a first associated identifier and a second associated identifier.

The first associated identifier corresponds to the specific resource and the second associated identifier corresponds to the second specific resource.

The first associated identifier corresponds to specific properties of a first downlink transmission beam set and the second associated identifier corresponds to specific properties of a second downlink transmission beam set.

The specific AIML functionality is determined based on a specific field in the specific MAC CE.

The specific MAC CE comprises:

>: a field indicating a serving cell for which the MAC CE applies;

>: a field indicating an uplink bandwidth part (BWP) for which the MAC CE applies; and >: a field indicating status of one or more AIML functionalities.

Figure 5A:
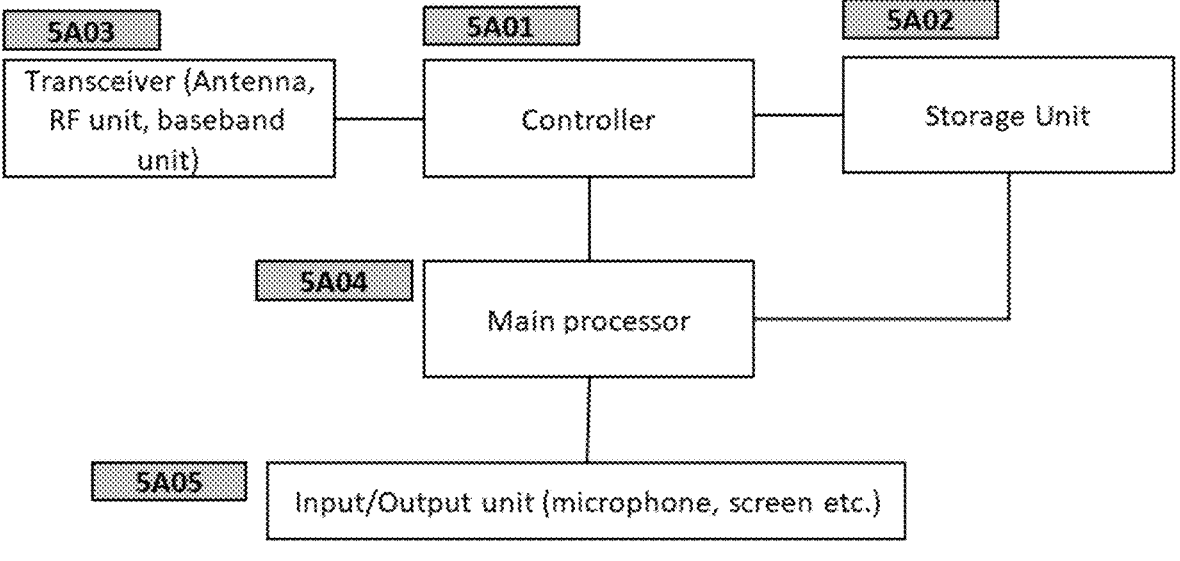
FIG. 5A is a block diagram illustrating the internal structure of a UE to which the disclosure is applied.

FIG. 5A is a block diagram illustrating the internal structure of a UE to which the disclosure is applied.

Referring to the diagram, the UE includes a controller 5A01, a storage unit 5A02, a transceiver 5A03, a main processor 5A04 and I/O unit 5A05.

The controller 5A01 controls the overall operations of the UE in terms of mobile communication. For example, the controller 5A01 receives/transmits signals through the transceiver 5A03. In addition, the controller 5A01 records and reads data in the storage unit 5A02. To this end, the controller 5A01 includes at least one processor. For example, the controller 5A01 may include a communication processor (CP) that performs control for communication and an application processor (AP) that controls the upper layer, such as an application program. The controller controls storage unit and transceiver such that UE operations in the present disclosure are performed.

The storage unit 5A02 stores data for operation of the UE, such as a basic program, an application program, and configuration information. The storage unit 5A02 provides stored data at a request of the controller 5A01.

The transceiver 5A03 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mixer, an oscillator, a digital-to-analog converter (DAC), an analog-to-digital converter (ADC), and the like. The RF processor may perform MIMO and may receive multiple layers when performing the MIMO operation. The baseband processor performs a function of conversion between a baseband signal and a bit string according to the physical layer specification of the system. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The main processor 5A04 controls the overall operations other than mobile operation. The main processor 5A04 process user input received from I/O unit 5A05, stores data in the storage unit 5A02, controls the controller 5A01 for required mobile communication operations and forward user data to I/O unit 5A05.

I/O unit 5A05 consists of equipment for inputting user data and for outputting user data such as a microphone and a screen. I/O unit 5A05 performs inputting and outputting user data based on the main processor's instruction.

Figure 5B:
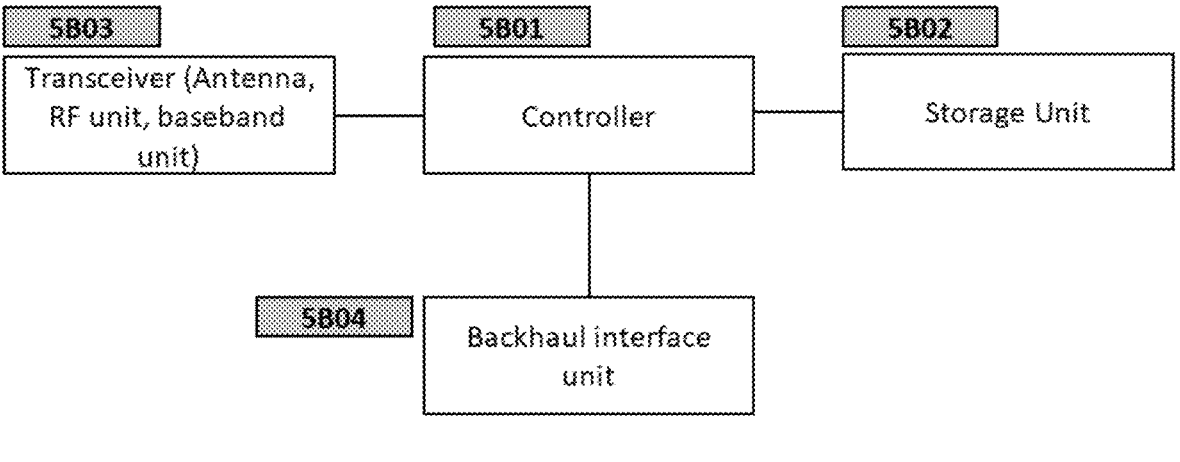
FIG. 5B is a block diagram illustrating the configuration of a base station according to the disclosure.

FIG. 5B is a block diagram illustrating the configuration of a base station according to the disclosure.

As illustrated in the diagram, the base station includes a controller 5B01, a storage unit 5B02, a transceiver 5B03 and a backhaul interface unit 5B04.

The controller 5B01 controls the overall operations of the main base station. For example, the controller 5B01 receives/transmits signals through the transceiver 5B03, or through the backhaul interface unit 5B04. In addition, the controller 5B01 records and reads data in the storage unit 5B02. To this end, the controller 5B01 may include at least one processor. The controller controls transceiver, storage unit and backhaul interface such that base station operation in the present disclosure.

The storage unit 5B02 stores data for operation of the main base station, such as a basic program, an application program, and configuration information. Particularly, the storage unit 5B02 may store information regarding a bearer allocated to an accessed UE, a measurement result reported from the accessed UE, and the like. In addition, the storage unit 5B02 may store information serving as a criterion to determine whether to provide the UE with multi-connection or to discontinue the same. In addition, the storage unit 5B02 provides stored data at a request of the controller 5B01.

The transceiver 5B03 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mixer, an oscillator, a DAC, an ADC, and the like. The RF processor may perform a down link MIMO operation by transmitting at least one layer. The baseband processor performs a function of conversion between a baseband signal and a bit string according to the physical layer specification of the first radio access technology. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The backhaul interface unit 5B04 provides an interface for communicating with other nodes inside the network. The backhaul interface unit 5B04 converts a bit string transmitted from the base station to another node, for example, another base station or a core network, into a physical signal, and converts a physical signal received from the other node into a bit string.

What is claimed is:

1. A method performed by a terminal, the method comprising:

receiving, by the terminal, from a base station, a radio resource control (RRC) reconfiguration message, wherein the RRC reconfiguration message comprises:

one or more sets of configuration parameters for Channel Status Information (CSI) reporting; and an applicability report configuration parameter;

transmitting, by the terminal, to the base station, an uplink RRC message for applicability reporting; and receiving, by the terminal, from the base station, a specific Medium Access Control (MAC) Control Element (CE);

upon receiving the specific MAC CE, performing, by the terminal, prediction for a first specific resource based on a measurement associated with a second specific resource.

2. The method of claim 1, wherein:

the first specific resource is determined based on a first resource configuration identifier in a specific set of configuration parameters for CSI reporting; and the second specific resource is determined based on a second resource configuration identifier in the specific set of configuration parameters for CSI reporting.

3. The method of claim 2, wherein:

the terminal performs a measurement on the second specific resource; and the terminal does not perform a measurement on the first specific resource.

4. The method of claim 2, wherein:

the specific set of configuration parameters for CSI reporting is determined based on a specific field in the specific MAC CE.

5. The method of claim 4, wherein:

the uplink RRC message comprises one or more applicability reports; and each of the one or more applicability reports comprises:

a serving cell index indicating an index of the serving cell that an applicability report refers to; and at least one identifier associated with the specific set of configuration parameters for CSI reporting.

6. The method of claim 2, wherein the uplink RRC message is either an RRC reconfiguration complete message or a User Equipment (UE) assistance information message.

7. The method of claim 6, wherein:

in case that the uplink RRC message is the RRC reconfiguration complete message, the uplink RRC message further comprises a specific identifier, wherein the specific identifier together with a message type identifies a corresponding RRC procedure; and in case that the uplink RRC message is the UE assistance information message, the uplink RRC message does not comprise the specific identifier.

8. The method of claim 2, wherein:

the specific set of configuration parameters for CSI reporting is associated with a first associated identifier and a second associated identifier;

the first associated identifier corresponds to the first specific resource; and the second associated identifier corresponds to the second specific resource.

9. The method of claim 8, wherein:

the first associated identifier corresponds to specific properties of a first downlink transmission beam set; and the second associated identifier corresponds to specific properties of a second downlink transmission beam set.

10. A terminal in a wireless communication system, the terminal comprising:

a transceiver configured to transmit and receive signals, and a controller configured to control the transceiver to:

receive, from a base station, a radio resource control (RRC) reconfiguration message, wherein the RRC reconfiguration message comprises:

one or more sets of configuration parameters for Channel Status Information (CSI) reporting; and an applicability report configuration parameter;

transmit, to the base station, an uplink RRC message for applicability reporting; and receive, from the base station, a specific Medium Access Control (MAC) Control Element (CE);

upon receiving the specific MAC CE, perform prediction for a first specific resource based on a measurement associated with a second specific resource.

\*  \*  \*  \*  \*